US012717398B2

(12) United States Patent
Udhayan et al.

(10) Patent No.: US 12,717,398 B2
(45) Date of Patent: Aug. 25, 2026

(54) METHODS AND APPARATUS TO ALIGN NETWORK TRAFFIC TO IMPROVE POWER CONSUMPTION

(71) Applicant: Intel Corporation, Santa Clara, CA (US)

(72) Inventors: Venkateshan Udhayan, Portland, OR (US); Sravan Akepati, Portland, OR (US); Shahrnaz Azizi, Cupertino, CA (US); Ajay Gupta, Portland, OR (US); Binu John, Portland, OR (US); Bharath Prabhu Perdoor, Hillsboro, OR (US); Leor Rom, Haifa (IL); Ashraf H Wadaa, Beaverton, OR (US); Alexander Min, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/484,861

(22) Filed: Sep. 24, 2021

(65) Prior Publication Data

US 2022/0011852 A1 Jan. 13, 2022

(51) Int. Cl.
*G06F 1/3296* (2019.01)
*G06F 9/48* (2006.01)
*G06N 20/00* (2019.01)

(52) U.S. Cl.
CPC .......... *G06F 1/3296* (2013.01); *G06F 9/4812* (2013.01); *G06N 20/00* (2019.01)

(58) Field of Classification Search
CPC .... G06F 1/3296; G06F 9/4812; G06F 1/3209; G06N 20/00; G06N 3/044; G06N 3/08; Y02D 30/70; H04W 52/0216; H04W 52/028
See application file for complete search history.

(56) References Cited

U.S. PATENT DOCUMENTS

| | | | | |
|---|---|---|---|---|
| 5,931,950 A * | 8/1999 | Hsu | G06F 1/3209 713/323 |
| 7,802,073 B1 * | 9/2010 | Cheng | G06F 9/3851 718/1 |
| 11,370,374 B2 * | 6/2022 | Wells | H02J 7/855 |
| 2003/0105983 A1 * | 6/2003 | Brakmo | G06F 1/3262 713/320 |
| 2003/0110012 A1 * | 6/2003 | Orenstien | G06F 9/4856 702/188 |
| 2003/0153368 A1 * | 8/2003 | Bussan | H04W 52/0216 455/343.1 |
| 2005/0132096 A1 * | 6/2005 | Raghunath | G06F 1/3215 710/15 |
| 2005/0278520 A1 * | 12/2005 | Hirai | G06F 1/329 713/1 |
| 2006/0107262 A1 * | 5/2006 | Bodas | G06F 9/5027 718/100 |

(Continued)

*Primary Examiner* — Faisal M Zaman
(74) *Attorney, Agent, or Firm* — Hanley, Flight & Zimmerman, LLC

(57) ABSTRACT

Methods, apparatus, systems, and articles of manufacture are disclosed to align network traffic to improve power consumption. Example instructions cause one or more processors to classify a workload based on network packets obtained via a wireless communication; determine heuristics of platform activities corresponding to the workload; and schedule network interrupts based on hardware-based wake interrupts from a sleep mode using the heuristics.

24 Claims, 15 Drawing Sheets

(56) References Cited

U.S. PATENT DOCUMENTS

2009/0249103 A1* 10/2009 Jeyaseelan ............ G06F 1/3203
713/300
2010/0080272 A1* 4/2010 Kwa .................. G06F 13/4221
375/222
2011/0154321 A1* 6/2011 Tian ...................... G06F 1/3203
718/1
2012/0072746 A1* 3/2012 Sotomayor ........... G06F 1/3243
713/320
2012/0084790 A1* 4/2012 Elshishiny ............ G06F 9/4893
718/108
2012/0210104 A1* 8/2012 Danko ................ G06F 9/30076
712/E9.035
2014/0173314 A1* 6/2014 Min ...................... G06F 1/3206
713/323
2014/0289546 A1* 9/2014 Min ...................... G06F 1/3228
713/323
2015/0138593 A1* 5/2015 Lizuka ............... H04N 1/00896
358/1.15
2016/0219519 A1* 7/2016 Elsayed ............ H04W 52/0216
2017/0031427 A1* 2/2017 Allen-Ware .......... G06F 1/3287
2017/0322614 A1* 11/2017 Holland ................ G06F 1/3287
2020/0358685 A1* 11/2020 Gupta .................. G06F 1/3215
2021/0105723 A1* 4/2021 Kiyoshige ............. H04W 84/22

* cited by examiner

Traditional Voice call flow (ex. Teams, Zoom call 20 msec view)

Optimized flow Network and audio works to complete within 5msec and ~15 msec of complete CPU idleness

METHODS AND APPARATUS TO ALIGN NETWORK TRAFFIC TO IMPROVE POWER CONSUMPTION

FIELD OF THE DISCLOSURE

This disclosure relates generally to computing platforms and network devices, and, more particularly, to methods and apparatus to align network traffic to improve power consumption.

BACKGROUND

Many locations provide Wi-Fi to connect Wi-Fi enabled devices to networks such as the Internet. Wi-Fi enabled devices include personal computers, video-game consoles, mobile phones, digital cameras, tablets, smart televisions, digital audio players, etc. Wi-Fi allows the Wi-Fi enabled devices to wirelessly access the Internet via a wireless local area network (WLAN). To provide Wi-Fi connectivity to a device, a Wi-Fi access point exchanges radio frequency Wi-Fi signals with the Wi-Fi enabled device within the access point (e.g., a hotspot) signal range. Wi-Fi is implemented using a set of media access control (MAC) and physical layer (PHY) specifications (e.g., such as the Institute of Electrical and Electronics Engineers (IEEE) 802.11 protocol).

BRIEF DESCRIPTION OF THE DRAWINGS

The figures are not to scale. In general, the same reference numbers will be used throughout the drawing(s) and accompanying written description to refer to the same or like parts.

Figure 1:
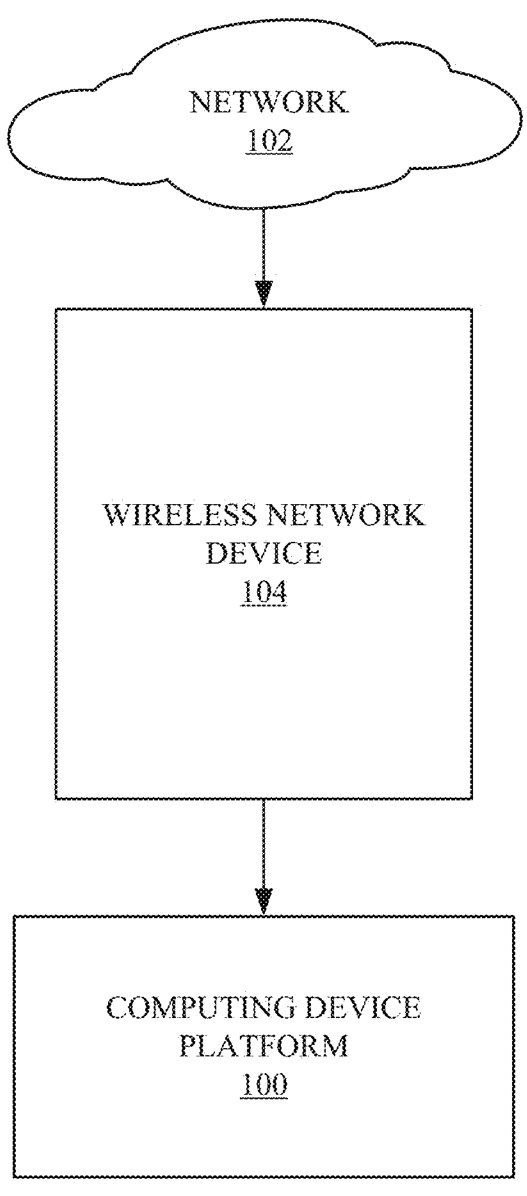
FIG. 1 is a block diagram of an example computing device platform operating in a wireless network system.

Descriptors "first," "second," "third," etc. are used herein when identifying multiple elements or components which may be referred to separately. Unless otherwise specified or understood based on their context of use, such descriptors are not intended to impute any meaning of priority, physical order, or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Wireless networks transmit and receive information utilizing varying techniques. For example, two common and widely adopted techniques used for wireless communication are those that adhere to the Institute for Electronic and Electrical Engineers (IEEE) 802.11 standards such as the IEEE 802.11n standard and the IEEE 802.11 ac standard.

The IEEE 802.11 standards specify a common Medium Access Control (MAC) Layer that provides a variety of functions to support the operation of IEEE 802.11-based wireless LANs (WLANs). The MAC Layer manages and maintains communications between IEEE 802.11 stations, such as between a modem (e.g., radio network interface cards (NIC) in a PC, other wireless device(s), or stations (STA)) and access points (APs), by coordinating access to a shared radio channel and utilizing protocols that enhance communications over a wireless medium.

Mobile platform power management is useful for battery-powered small form factor platforms such as smartphones, tablets, and wearable and IoT devices. Most mobile platform workloads are communication driven and the modem (e.g., wireless radio NIC) is often one of the main sources of the power consumption of the platform. With the continuous demand for prolonging the battery life of client platforms (mobile platforms, non-mobile platforms, etc.), along with defining new key performance indicators (KPIs) for latency and responsiveness over wireless links (e.g., a wireless distribution method that provides a connection between the Internet and the client platform through an access point (AP)), there is an emergent need to reduce overall platform power consumption without affecting the user experience.

A modem is a hardware device that converts data into a format suitable for a transmission medium so that the data can be transmitted from one computing system to another. In recent years, modems have been integrated on platforms of personal computing devices, such as laptops, tablets, mobile phones, etc., to facilitate data transmission and data connection between the personal computing devices and a network. For example, modems convert data from a network (e.g., from an AP) into a form that processors of the personal computing device can understand and then send the data to memory accessed by the processors. Developers of the integrated platforms have designed and fabricated hardware and software features that enable such an integrated platform to efficiently move data to and from a network and the main processing component (e.g., central processing unit, accelerator, etc.). Such features may facilitate a communication and/or coordination system between the main processing component and the modem, where the modem can coordinate particular times to send data to memory accessed by the main processing unit.

In some examples, the coordination between the main processing component and a network interface controller (NIC) facilitates power saving by enabling the main processing component to operate in low power states when network traffic is idle. For example, it is desirable to schedule CPU and/or other hardware to operate in sleep mode when the network traffic is idle. However, in some processing systems, the main processing components and/or the NIC is/are not aware of networking protocols corresponding to the data being processed by the NIC. Accordingly, the CPU is unaware of when network interrupts from the NIC will be received and cannot schedule sleep mode based on the network traffic. Thus, in such processing systems, the main processing element schedules sleep mode for hardware components (e.g., memory, display, etc.) randomly with respect to network activity and the sleep mode is interrupted when a network interrupt is obtained at the NIC. By not aligning network wakes with the rest of the system activities (e.g., CPU, display, memory, etc.), sleep modes of the computing system are shorter resulting in more power consumption and/or less battery life. Examples disclosed herein align network wake interrupts with the rest of the computing device activity to increase computing device idleness, increase power savings, and/or increase battery life.

In order to determine when network interrupts are scheduled, examples disclosed herein first classify network workloads (e.g., determine workload types) with a AI-based model (e.g., a machine learning model, a deep leaning model, a neural network). Examples disclosed herein train a model to classify network data packets into a workload category (e.g., a workload type). Examples disclosed herein include a modem/NIC that, when active, infers the type of incoming network data packets and classifies the workload type based on the type of network data packets.

After the workload type has been determined (e.g., identified, classified, etc.), examples disclosed herein determine the corresponding protocol to the identified workload type to determine when network interrupts and/or network activity will occur at the NIC. After the protocol is determined, examples disclosed herein align network interrupts with the hardware sleep schedule and wake-up interrupts (e.g., to align the network interrupts with durations of time when the hardware is awake). Using examples disclosed herein, computing systems can realize 5% power savings with respect to streaming video, 12-20% power savings with respect to voice calls, and 8-10% power savings with respect to video conferencing.

Examples disclosed herein implement artificial intelligence to classify workload types based on obtained network data that enable a processor to align network traffic with sleep schedule for hardware. Artificial intelligence (AI), including machine learning (ML), deep learning (DL), and/or other artificial machine-driven logic, enables machines (e.g., systems, computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model is used. Using a neural network model enables the classification of network data packets based on their packet features, such as length (e.g., number of packets corresponding to a same workload flow), inter-arrival time, source, destination, etc. In general, machine learning models/architectures that are suitable to use in the example approaches disclosed herein will be Recurrent Neural Networks (RNN). However, other types of machine learning models could additionally or alternatively be used such as Long/Short Term Memory (LSTM) models, a Radial basis models, Kohonen Self Organizing models, etc.

In general, implementing a ML/AI system involves at least two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed until an acceptable amount of error is achieved in predicting and classifying network data packets. In examples disclosed herein, training is performed at the computing device (e.g., locally). In some examples, training is performed remotely (e.g., at a central facility). Training is performed using hyperparameters that control how the learning is performed (e.g., a learning rate, a number of layers to be used in the machine learning model, etc.). In examples disclosed herein, hyperparameters that control a number of packet features and packets per network flow are used. Such hyperparameters are selected based on, for example, compute capabilities of the computing device and/or the central facility and real-time requirements. In some examples re-training may be performed. Such re-training may be performed in response to an unknown packet features, new workload categories, etc.

Training is performed using training data. In examples disclosed herein, the training data originates from locally generated data. Because supervised training is used, the training data is labeled. Labeling is applied to the training data by a pre-process controller. In some examples, the training data is pre-processed using, for example, known features that indicate a workload type of network data packets.

Once training is complete, the model is deployed for use as an executable construct that processes an input and provides an output based on the network of nodes and connections defined in the model. The model is stored at the modem of the personal computing device. The model may then be executed by the prediction controller of the modem. In other examples, a network interface card (NIC) stores the model at the personal computing device, where the host networking stack is executed. Additionally and/or alternatively, the model is stored externally if the modem does not have the resources (e.g., compute capabilities) to execute such a model.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns of the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.). For example, a workload may be classified as real-time or non-real-time, where the real-time workload is further classified as a type of real-time (e.g. audio only, audio video, gaming, etc.) workload and the non-real time workload may be further classified as a type of non-real-time workload.

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is a block diagram of an example computing device platform 100 operating in a wireless network system. The example wireless network system of FIG. 1 includes the example computing device platform 100, an example network 102, and an example wireless network device 104.

In FIG. 1, the example computing device platform 100 is hardware and/or software implemented to execute workloads, such as applications, programs, process, etc., at a computing device. The example computing device platform 100 defines a set of capabilities of the computing device. The computing device platform 100 may be any hardware computing device such as a mobile phone, laptop, tablet, desktop, etc., any operating system platform, any client/server platform such as a web server, any mobile platform such as a mobile application platform, any cloud platform, and/or any other suitable platform for executing data packets. The example computing device platform 100 is described in further detail below in connection with FIG. 2.

In FIG. 1, the example network 102 is the Internet. However, the network 102 may be implemented using any suitable wired and/or wireless network(s) including, for example, one or more data buses, one or more Local Area Networks (LANs), one or more wireless LANs (WLANs), one or more cellular networks, one or more private networks, one or more public networks, etc. The example network 102, in connection with the example wireless network device 104, enables the computing device platform 100 to send and receive network information requested by a user of the computing device platform 100.

In FIG. 1, the example wireless network system includes the example wireless network device 104 to enable the example computing device platform 100 to connect to the example network 102. In FIG. 1, the example wireless network device 104 is an Access Point (AP). However, the example wireless network device 104 may be any other type of hardware and/or software device that connects the example computing device platform 100 to the example network 102. The example wireless network device 104 may service multiple computing device platforms. For example, the wireless network device 104 may connect any number of client platforms, such as mobile phones, laptops, tablets, etc., to the network 102 to receive Internet data and/or network data. In some examples, the wireless network device 104 communicates and/or routes Internet and/or network data to the computing device platform 100 when the computing device platform 100 establishes a Wi-Fi (802.11) connection with the wireless network device 104. Conventionally, the Wi-Fi connection between the wireless network device 104 and the computing device platform 100 is generic and follows the 802.11 protocol (e.g., the wireless network device 104 is unaware of workload and user requirements of the computing device platform 100 and operates as normal under the 802.11 protocol). However, in examples disclosed herein, the example computing device platform 100 establishes a Wi-Fi connection with the example wireless network device 104 and coordinates timing of network data retrieval and transmittal based on workload requirements and user requirements. Although FIG. 1 corresponds to WI-FI, examples disclosed herein can be used in conjunction with other wireless communication technologies, such as cellular, 5G, 6G, etc.

Figure 2:
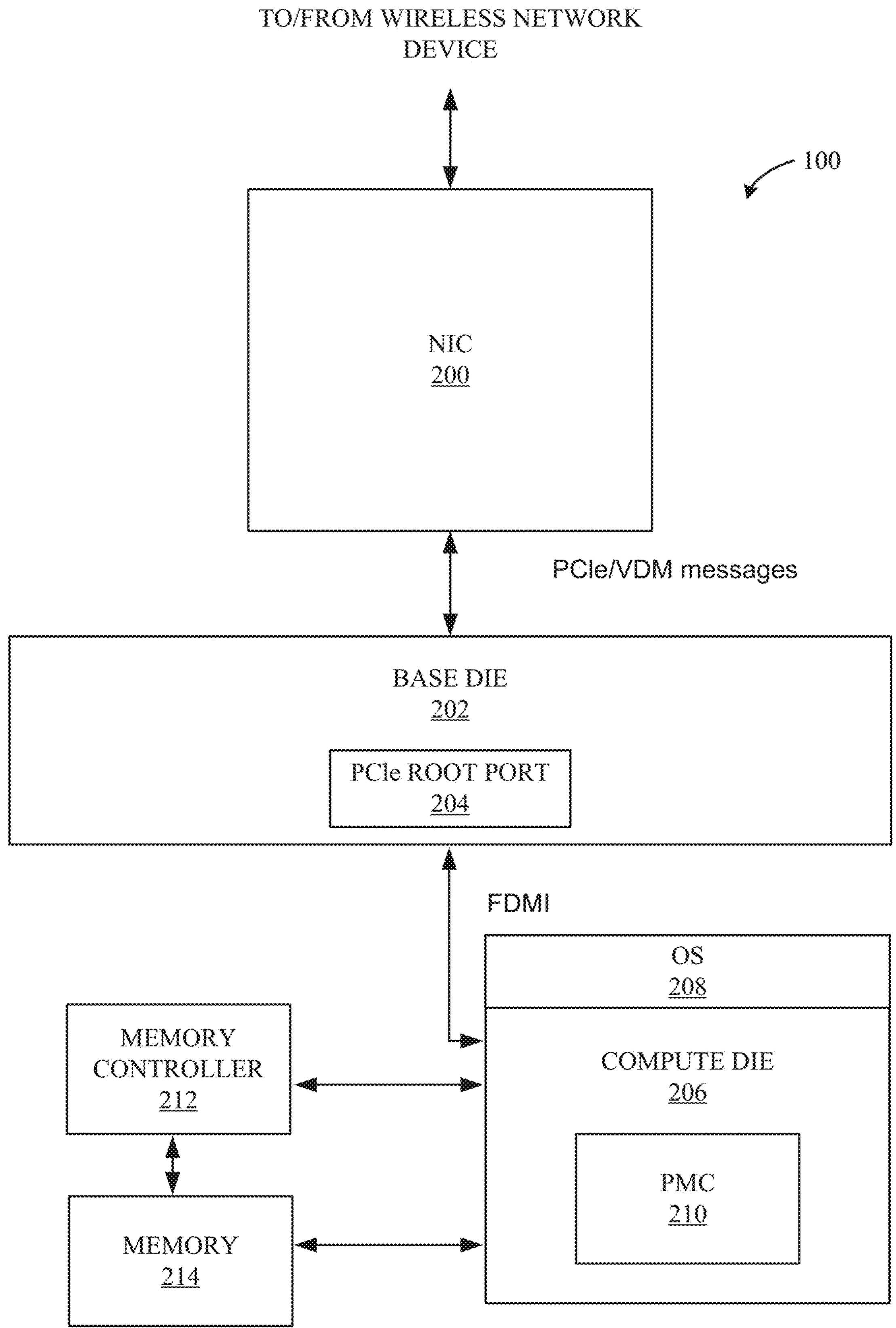
FIG. 2 is a block diagram of the example computing device platform of FIG. 1.

FIG. 2 is a block diagram of the example computing device platform 100 of FIG. 1 to align network interrupts with sleep/wake schedules based on the network traffic corresponding to categorized workload types to ensure that network interrupts occur while hardware components are awake. As used herein, network traffic, network data, network packet data, incoming network data, and packet data are terms that are defined as data, received from an example network 102, that is to be stored in memory of the computing device 100 and operated upon by a processor implemented on the example compute die 206 to perform an operation. As used herein, interrupt triggers, interrupts, and an interrupt trigger are terms that are defined as events generated to cause the compute die 206 and/or an example network interface chip (NIC) 200 to perform one or more actions. The example computing device platform 100 includes the example NIC 200, an example base die 202, an example PCLe root port 204, the example compute die 206, an example OS 208, an example power management controller (PMC) 210, an example memory controller 212, and example memory 214. The memory 214 may be any suitable memory, such as volatile random access memory (RAM), cache memory, etc. In some examples, the components of FIG. 2 may be implemented in the example wireless network device 104 of FIG. 1.

In FIG. 2, the example computing device platform 100 includes the example NIC 200 to mediate data communication between the example network 102 and the example compute die 206 as well as coordinate data exchange between the example NIC 200 and the example wireless network device 104 of FIG. 1. The example NIC 200 may be and/or include a modem. The example NIC 200 may transform network data into information readable and executable by the example compute die 206. The example NIC 200 may determine types of network data (e.g., workload and traffic type) being received and communicate the types to facilitate a coordination hardware-based sleep schedules with network traffic corresponding to the type of network data. Additionally and/or alternatively, the example compute die 206 (e.g., including a CPU, a FGPA, etc.) may determine the types of network data being received and provide the types to the NIC 200 for generation of latency messages. The example NIC 200 may buffer network data to allow the example compute die 206 to enter into different C-states. The example NIC 200 may generate interrupts to wake the memory 214 and compute die 206 for retrieving the network data. The NIC 200 may be any suitable hardware and/or software interface that mediates data communication (e.g., coordinates buffering and interrupting) between the example wireless network device 104, the example NIC 200, and the example compute die 206. The example NIC 200 can be in different states depending on different states of the example computing device platform 100 (e.g., on or off). When the example computing device platform 100 is on, the example NIC 200 can be in a sleep state, an idle state, or an active state. The states of the example NIC 200 also depend on the network traffic from the example wireless network device 104 and/or more generally, the example network 102. For example, the NIC 200 is active when the NIC 200 receives data from the network 102, when the NIC 200 sends data to the memory 214, when the NIC 200 sends data to a different computing device via the network 102, etc. The example NIC 200 is idle when the NIC 200 buffers data from the example network 102, when the NIC 200 does not include network data to send to the network 102 via the wireless network device 104, when the NIC 200 does not have network data to receive from the network 102 via the wireless network device 104, etc. The example NIC 200 is in a sleep state when the example NIC 200 is not receiving data from the example network 102 and/or from the example memory 214, when the example computing device platform 100 is off, etc. In some examples, the state of the NIC 200 is associated with the C-states of the compute die 206.

In some examples, the NIC 200 is implemented at an edge device. For example, processing tasks (e.g., the functionality, operations, etc.) of the NIC 200 may be offloaded to an edge device. In other examples, the NIC 200 is implemented at a cloud platform. For example, processing tasks of the NIC 200 may be offloaded and/or virtualized at a cloud platform. In such examples, the NIC 200 reduces the processing power consumption consumed at the computing device platform 100 and the processing tasks operating (e.g., executing) at the computing device platform 100. The example NIC 200 is described in further detail below in connection with FIGS. 3 and 4.

In FIG. 2, the example computing device platform 100 includes a computer bus to connect the example NIC 200 to the example memory controller 212, and the example compute die 206. The computer bus facilitates communication between the NIC 200 and the other devices of the example computing device platform 100. For example, the computer bus obtains notifications, messages, information, data, etc., from the NIC 200 and directs the data to the appropriate hardware components of the computing device platform 100. In some examples, the computer bus is included in the NIC 200. Additionally and/or alternatively, the example computing device platform 100 includes any number of computer busses to connect different hardware components of the computing device platform 100. The computer bus is a peripheral component interconnect express (PCI-e) device. Additionally and/or alternatively, the computer bus may be an accelerated graphics port (AGP), a peripheral component interconnect extended (PCI-X) device, and/or any other suitable bus for the example compute die 206. In this manner the NIC 200 can pass VDM messages (e.g., side-band messages) to the example base die 202.

In FIG. 2, the example computing device platform 100 includes the example base die 202 to connect the example memory 214 and the example compute die 206 to the computer bus via the example PCLe root port 204. The example base die 202 generates transaction requests on behalf of the example compute die 206, which is interconnected through a local bus (e.g., the fabric device management interface (FDMI)). The example base die 202 may be and/or include a root complex functionality implemented as a discrete device or integrated with the example compute die 206. In some examples, the base die 202 may be a host bridge that interfaces the host (e.g., the compute die 206) with the computer bus.

In FIG. 2, the example computing device platform 100 includes the example compute die 206 to implement one or more processors to perform workload execution of network data. The example compute die 206 may be and/or include a CPU, an FPGA, a GPU, a neural processing unit (NPU), an accelerator, and/or any other type of hardware that executes workloads. The example compute die 206 includes multiple power modes, which are collectively called "C-states" or "C-modes." The C-states enable the example compute die 206 to enter into particular power saving modes. For example, a first C-state (C0) is indicative that the compute die 206 is operating using full power. A second C-state (C1) is indicative that only a portion of the example compute die 206 is operating with full power but a different portion is turned off (e.g., not provided power). A third C-state (C2) is indicative that more than half of hardware in the example compute die 206 is turned off but a smaller portion of the processor hardware is still operating. A fourth C-state (C3) is indicative that the example compute die 206 is in a sleep state (e.g., the hardware is turned off and power supplied to the compute die 206 is reduced). In some examples, the compute die 206 enters different C-states corresponding to different power saving levels not described above. When the example compute die 206 enters a C-state greater than the first C-state, power consumption of the example computing device platform 100 is reduced, thereby saving battery life. As further described below, the example compute die 206 is informed of the level of C-state to enter and the scheduling for entering the C-state based on the type of workloads that the NIC 200 is executing. For example, the NIC 200 can determine workload types to identify a type of communication and/or a protocol (e.g., video conferencing, audio streaming, video streaming (YouTube, Netflix, HBO Max, etc.), etc.). In response to determining a workload type, the NIC 200 communicates the workload type to the PMC 210 of the computing die 206 via the base die 202 using side-band messages. In this manner, the PMC 210 can generate a network interrupt schedule based on the sleep schedule and/or heuristics to align the network interrupts with the hardware sleep schedule based on the workload type.

In FIG. 2, the example OS 208 of FIG. 1 is a software system managing the compute die 206 to manage hardware of the computing device 100, software resources, and/or provides servers for computer programs and/or applications.

In FIG. 2, the example PMC 210 generates a network interrupt schedule for the compute die 206, memory controller 212, memory 214, base die 202, and/or NIC 200 based on heuristics of platform activities (also referred to as heuristics) (e.g., display wake, thermal info, interrupts from different sources (e.g., an OS, an application, etc.) while the workload is running) that correspond to the obtained workload type to align network interrupts corresponding to network traffic with wake up interrupts for hardware components corresponding to the workload type. Additionally, the PMC 210 determines when entering into sleep mode may not be possible because of the frequency of data being obtained at the NIC 200. For example, particular work types may send data so frequently, that there is not sufficient time to cause any hardware component to enter into a sleep mode. When the example PMC 210 obtains a classified workload type, the PMC 210 uses a lookup table to identify the heuristics corresponding to the workload and whether the workload type corresponds to a sleep schedule or not. If the workload does not correspond a sleep schedule, the PMC 210 does not generate a sleep schedule for the hardware. If the workload corresponds a sleep schedule, the PMC 210 determines the network interrupt schedule of the workload based on a sleep schedule based on the workload type. For example, a first workload corresponding to a particular voice call protocol (e.g., a Teams call, a Zoom call, etc.) may correspond to audio traffic and/or network wakes (e.g., a 5 milliseconds (ms) of network traffic followed by 15 ms of idle time). In such an example, the PMC 210 can schedule the network interrupts to handle the 5 ms of traffic while the hardware is awake. The example PMC 210 is further described below in conjunction with FIG. 5.

In FIG. 2, the example computing device platform 100 includes the example memory controller 212 to store and retrieve data from the example memory 214 based on instructions from the example compute die 206 and/or the example NIC 200. For example, the memory controller 212 includes logic that reads an input (e.g., instructions) and manages data storage and eviction based on the input. In some examples, the NIC 200 instructs the memory controller 212 to give network data to the compute die 206, halt communications with the compute die 206, etc.

Figure 3:
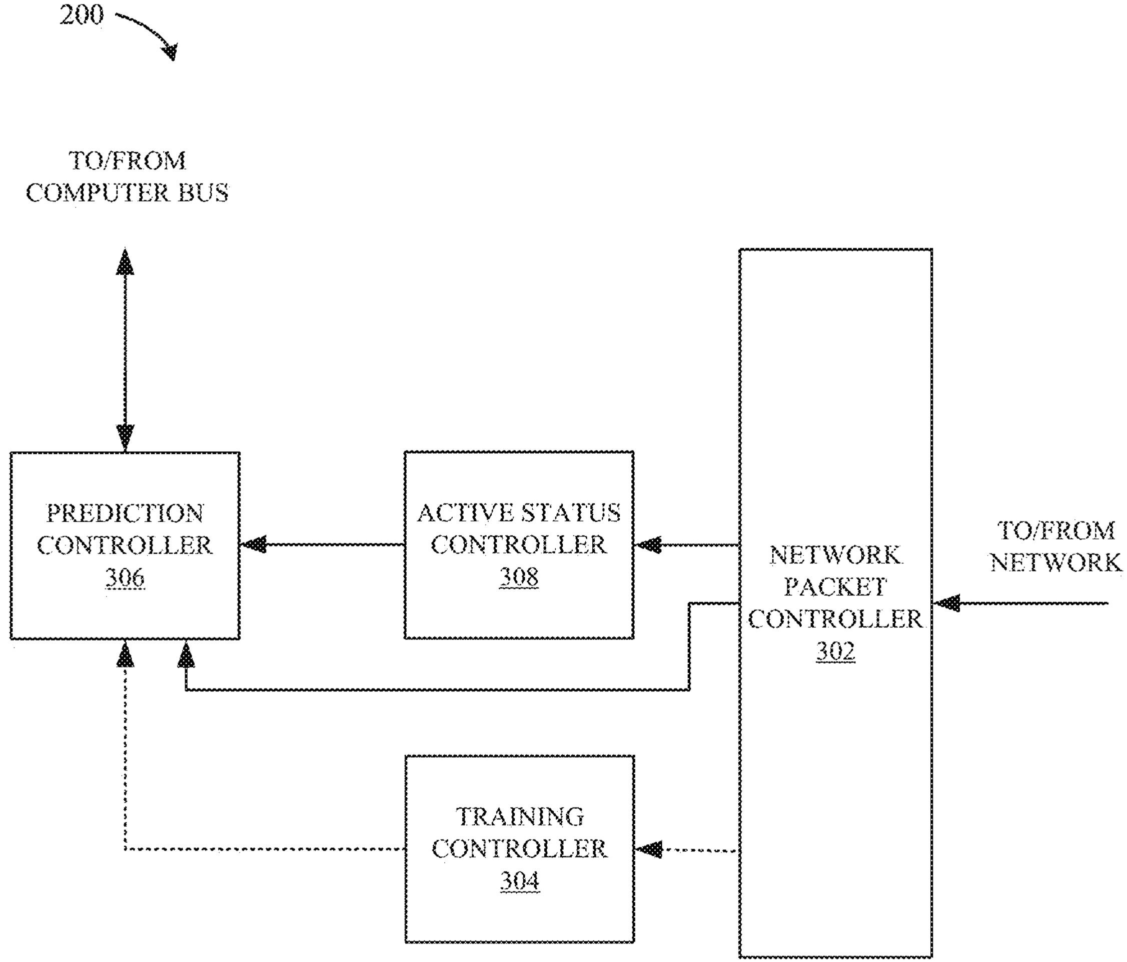
FIG. 3 is a block diagram of an example modem of the example computing device platform of FIG. 2.

FIG. 3 is a block diagram of the example NIC 200 of FIG. 2. The example NIC 200 includes an example network packet controller 302, an example training controller 304, an example prediction controller 306, and an example active status controller 308. The dotted flow lines represent the training phase to train a model to predict workload types based on the network data packets. For example, the operations performed by the network packet controller 302 and the training controller 304 occur in a learning and/or training phase of the computing device platform 100. The solid flow lines represent the inference phase to predict the workload types based on the trained model. For example, the operations performed by the network packet controller 302 and the active status controller 308 occur in an inferring and/or predicting phase. It should be understood that the operations described below in connection with the example NIC 200 can be performed in connection with the example compute die 206 of FIG. 2. For example, the compute die 206 may include the example network packet controller 302, the example training controller 304, the example prediction controller 306, and the example active status controller 308. In such an example, a modem and/or NIC, such as the NIC 200, may not include the processing capabilities and/or hardware to execute the operations described below and, thus, the compute die 206 (e.g., a CPU, FPGA, GPU, NPU, and/or any other type of accelerator) performs the operations of training a model, inferring workload and traffic types of the network data packets, and communicating buffer times with the wireless network device 104 among other operations.

In FIG. 3, the example NIC 200 includes the example network packet controller 302 to control network data packet flows coming in from the example wireless network device 104. A network data packet is a formatted unit of data carried by the wireless network device 104 that consists of a payload (e.g., control information and user data) and five tuples: a source address, a source port, a destination address, a destination port, and a protocol. For example, the network data packet includes a similar format as the AP data frame 110 of FIG. 1, where the payload is the frame body and the five tuples are a media access controller (MAC) header. The example network packet controller 302 may identify and/or separate network data packets belonging to different tuples. For example, the network packet controller 302 collects network data packets that may correspond to different workloads (e.g., the computing device platform may be running an email application and a conference call simultaneously). The example network packet controller 302 can identify the different network data packets based on the five tuples (e.g., the MAC header), wherein if a first network data packet and a second network data packet have matching tuples, then the network data packets correspond to the same workload. The example network packet controller 302 operates in a training mode or an inference mode. For example, in training mode, the network packet controller 302 passes the network data packets to the training controller 304. In other examples, in inference mode, the network packet controller 302 passes the network data packets to the prediction controller 306 (e.g., via the active status controller 308 or other means of wireless and/or wired communication). The example network packet controller 302 of FIG. 3 may implement means for controlling. The controlling means is hardware including at least one processor.

In FIG. 3, the example NIC 200 includes the example training controller 304 to train a model to classify network data packets into a workload type category. The example training controller 304 obtains network data packets from the example network packet controller 302 and pre-processes the network data packets into samples with assigned labels, the samples related to a single network flow (e.g., a workload) and including multiple packet features. The example training controller 304 inputs the samples into an example neural network to enable the model to learn, through the features of the samples and assigned labels, to what type of workload the network data packet corresponds. For example, the training controller 304 classifies network data packets into a video category, a gaming category, an audio category, a streaming category, a batch category, an analytics category, and/or a transactional category. Additionally, the example training controller 304 may include more categories than the ones listed above. Once trained, the example training controller 304 generates and publishes the trained model and provides the model to the example prediction controller 306. The example training controller 304 is described in further detail below in connection with FIG. 4. The example training controller 304 of FIG. 3 may implement means for generating. The generating means is hardware including at least one processor.

In FIG. 3, the example NIC 200 includes the example prediction controller 306 to categorize network data packets into workload types and assign the network data packets corresponding labels. The example prediction controller 306 operates in an inference mode such that the example prediction controller 306 obtains network data packets from the example network packet controller 302 in real time, meaning that the prediction controller 306 obtains current (e.g., up-to-date) network data packets. The example prediction controller 306 assigns priority labels, along with workload category labels, to the network data packets based on the classification. For example, the prediction controller 306 analyzes information included in the network data packets (e.g., a capability information field and/or an optional field of an access point (AP) data frame) corresponding to priority requirements (e.g., Quality of Service (QoS)) of the workload to assign priority levels to the network data packets. For example, a first network data packet classified into the gaming category corresponds to a high level priority relative to a second network data packet classified into a batch category. The levels of priority correspond to the time and performance requirements of the workload. For example, a voice call (e.g., in an audio category) requires minimum latency and high performance from the memory 214 and compute die 206 relative to an email (e.g. in the batch category) that does not require such high performance and/or minimum latency from the memory 214 and the compute die 206. In some examples, the prediction controller 306 assigns workload category labels (e.g., workload type labels) and identifies priority labels (e.g., QoS label) tagged in the frame body of the network data packets. Some network data packets include such priority labels and some network data packets do not. Therefore, the example prediction controller 306 is to determine priority labels, based on the workload category, when the network data packets do not include the priority information. In some examples, the prediction controller 306 identifies more than one workload category for more than one network data packet received at the network packet controller 302. For example, the prediction controller 306 receives inputs of data packets belonging to a single network flow but analyzes multiple network flows that may be running at the compute die 206 simultaneously. In such an example, the prediction controller 306 assists in identifying which network flows to buffer and which to not buffer, based on workload categories and priority labels. In some examples, the prediction controller 306 outputs classification and labelled network data packets to the example PMC 210 via the example base die 202 (e.g., using sideband messages). In some examples, the prediction controller 306 is triggered by the active status controller 308 to make network data packet predictions. The example prediction controller 306 of FIG. 3 may implement means for predicting. The predicting means is hardware including at least one processor.

In FIG. 3, the example NIC 200 includes the example active status controller 308 to determine the state of the NIC 200. The example active status controller 308 can determine whether the example NIC 200 is active, idle, or inactive. For example, the active status controller 308 can obtain information from hardware registers of the NIC 200 indicating the state of the NIC 200. In other examples, the active status controller 308 can query the base die 202 of FIG. 2 for information regarding the state of the compute die 206 of FIG. 2 (e.g., on or off), which corresponds to and/or is associated with the state of the NIC 200. In some examples, the active status controller 308 updates each time the state of the NIC 200 updates. In some examples, the active status controller 308 sends a trigger to the prediction controller 306 when the NIC 200 is in an active state. The example active status controller 308 of FIG. 3 may implement means for determining. The determining means is hardware including at least one processor.

An example training operation of the NIC 200 is described below. During the training operation, the example network packet controller 302 obtains data packets from the example wireless network device 104. In some examples, the data packets correspond to one workload and/or different workloads. In some examples, the network packet controller 302 is configured to act as a packet capturer (e.g., packet sniffer) during training mode. For example, the network packet controller 302 may be triggered to capture one or more particular workloads based on a filter (e.g., a filter set by an operator, developer, etc., that filters through network data packets and captures the ones belonging to a particular workload) in order to pre-identify the type of workload for training. For example, the network packet controller 302 is configured to capture types of data packets belonging to the one or more particular workloads. The example network packet controller 302 identifies data packets corresponding to one workload and/or more specifically, a single network flow. A network flow is defined as all data packets (e.g., bi-directional) belonging to the same five tuple (e.g., header). Therefore, the example network packet controller 302 identifies data packets having the same five tuple (e.g., source address, source port, destination address, destination port, and protocol) and collects them, creating a group of data packets corresponding to a workload. The example network packet controller 302 collects data packets corresponding to the same network flow because it can be assumed that the data packets of the same network flow have the same priority requirements (e.g., QoS requirements) and, thus, priority requirements can be identified at the flow level.

The example network packet controller 302 provides the data packets to the example training controller 304 for learning and classifying the data packets into a workload type category. For example, the training controller 304 obtains the data packets grouped together as a single flow and begins the process of pre-processing (e.g., identifying a workload type) the data packets and training a model to identify the workload type without assistance from additional sources (e.g., the pre-processor, a database, program developers, etc.).

The example training controller 304 obtains data packets from the example network packet controller 302 and assigns a priority tag and workload type to the data packets. For example, the training controller 304 may determine the priority tag (e.g., the QoS) based on the frame body of the data packets. Different workloads require defined QoS tags to be executable. Therefore, developers of an application (e.g., a workload) may define, in the application header and/or metadata, the type of quality required to execute the functions of the application. The definition of quality may be implemented in the frame body of the data packets upon transmission through a network (e.g., the network 102), and the example training controller 304 can analyze the frame body and identify the quality of service. The QoS of a workload may be defined by defining minimum and/or maximum values that the computing device platform 100 must meet during execution of the workload. Such values may correspond to packet loss, bit rate, throughput, jitter, transmission delay, latency, availability, etc. For example, voice call workloads may require that the computing device platform 100 executes the workload with minimum packet loss and transmission delay as well as high throughput and bit rate. In some examples, the priority tag (e.g., QoS tag) is a numerical value corresponding to a ranking, where a lower value is indicative that the workload does not require a high level of service and a higher value is indicative that the workload requires a high level of service. In some examples, an application and/or software developer may not define priority requirements or the wireless network device 104 may not support priority field capabilities in the data packets. In such an example, the training controller 304 may identify the priority tag (e.g., priority requirement) based on the workload type.

The example training controller 304 obtains data packets from the example network packet controller 302 (e.g., including and/or excluding the QoS tag) and selects n packet samples from the data packets corresponding to the same network flow (e.g., workload), where n is a number of data packets. For example, the training controller 304 determines the n number of packet samples based on the computational capabilities of the NIC 200. For example, NIC 200 can be of any size and include any number of hardware components that can process data up to a particular amount and a certain speed. Therefore, n is selected based on hardware and/or software features of the example NIC 200.

In some examples, the network packet controller 302 selects n packet samples to provide to the training controller 304. In some examples, the network packet controller 302 assigns the workload label to the n packet samples prior to providing the samples to the training controller 304 based on packet traces captured for that workload. For example, the filters set for the network packet controller 302 during training mode may facilitate storage and/or saving of packet traces in particular files based on the packets' characteristics, where the files are named based on the workload type. For example, file packet audio streaming may include and/or otherwise contain packet samples corresponding to an audio streaming workload.

The example training controller 304 extracts f packet features from the n samples, where f is the number of features of one of the n packet samples. The example training controller 304 assigns workload labels to the n packet samples and the f features based on the packet traces captured for that workload.

When the example training controller 304 tags and/or assigns labels to the n packet samples, the example training controller 304 trains a model with the n packet samples and f features. For example, the training controller 304 inputs the labelled n packet samples with corresponding f features and associates the f features with the workload types. The example training controller 304 inputs multiple sets of n packet samples corresponding to different workloads during training. The example training controller 304 may pause training to evaluate and/or test the model against a random data set (e.g., randomly selected data packets). For example, the training controller 304 may utilize K-Fold Cross validation by splitting the data set into a K number of sections/folds where each fold is used as a testing set at some point. When testing and evaluation of the model evaluates that a certain amount of error has been achieved, the example training controller 304 publishes the model and provides the published model to the example prediction controller 306.

Figure 4:
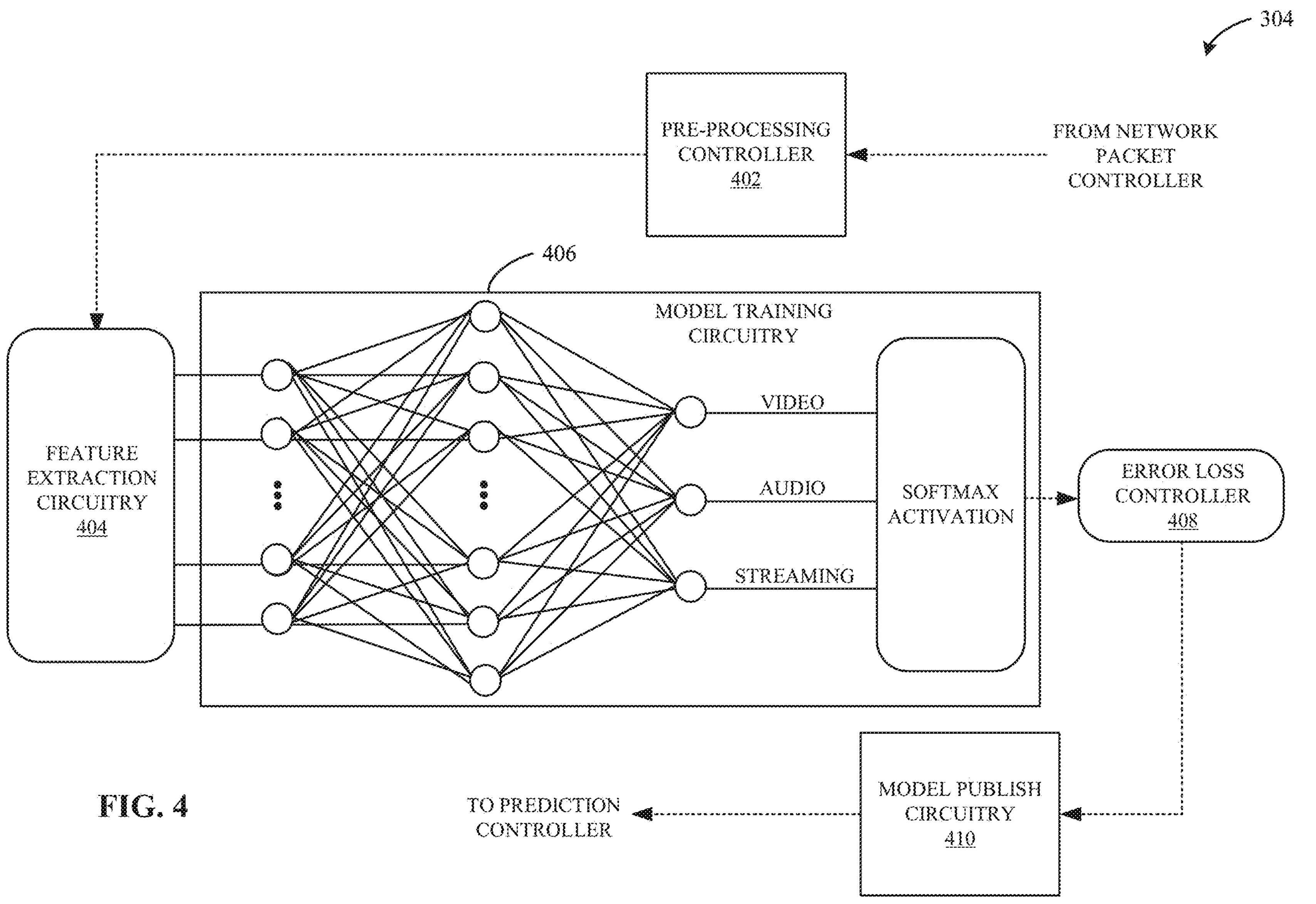
FIG. 4 is a block diagram of an example training controller of the example modem of FIG. 3.

Turning to FIG. 4, a block diagram of the example training controller 304 is illustrated to train the model to classify data packets into workload categories. The workload categories can be audio workloads, video workloads, streaming, and/or any other type of workload. The example training controller 304 includes an example pre-processing circuitry 402, an example feature extraction circuitry 404, an example model training circuitry 406, an example error loss controller 408, and an example model publication circuitry 410.

In FIG. 4, the example training controller 304 includes the example pre-processing circuitry 402 to assign labels to data packets. The example pre-processing circuitry 402 obtains data packets from the example network packet controller 302 and selects n data packets, belonging to a single network flow, to use as input samples. In some examples, the packet controller 302 obtains n data packets from the network packet controller 302. The example packet controller 302 assigns the workload label to the n packet samples based on the packet traces and/or information corresponding to the packet traces captured by the example network packet controller 302.

The example pre-processing circuitry 402 extracts f features from the n packet samples. For example, the pre-processing circuitry 402 may extract features such as packet length, inter-arrival time, packet direction, and QoS tags. The example pre-processing circuitry 402 may extract any other statistical features and/or characteristics from the packet samples that are useful in identifying the type of workload. In some examples, the pre-processing circuitry 402 can extract features corresponding to a header and/or frame body of the packet samples. The header of packet samples can be useful for the model training circuitry 406 in determining the workload type. For example, an email packet may include a particular protocol identifier (e.g., indicated in the optional field element 128 of the AP data frame 110) that is specific to email. In other examples, the pre-processing circuitry 402 extracts features corresponding to the inter-packet arrival times of the packet samples which can be useful for the model training circuitry 406 in determining the workload type. For example, the inter-packet arrival times can be used to infer that the packet samples correspond to an audio workload category. For example, if data packets are being sent to the NIC 200 on average every 20 milliseconds (ms), the inter-packet arrival time of the n packet samples may be equal to approximately 20 ms with some standard deviation. In such an example, packet samples having an inter-packet arrival time equal to approximately 20 ms may correspond to an audio category. Additionally, if the packet samples are relatively small in length (e.g., bit length) and have an inter-packet arrival time of 20 ms, then the packet samples correspond to the audio category.

In FIG. 4, the example pre-processing circuitry 402 assigns the identified workload category label (e.g., identified by the packet traces captured) to the n packet samples and then provides the labeled packet samples to the example feature extraction circuitry 404. In some examples, the pre-processing circuitry 402 appends and/or prepends metadata to the n packet samples including a string of characters or some other type of identifier. Additionally, the example pre-processing circuitry 402 may tag the n packet samples with a priority tag (e.g., a QoS tag) corresponding to the priority requirements of the network flow. In some examples, the pre-processing circuitry 402 obtains second, third, fourth, fifth, etc., sets of data packets from the network packet controller 302, corresponding to different network flows, and selects n packet samples and f features to which workload labels are assigned.

In FIG. 4, the example training controller 304 includes the example feature extraction circuitry 404 to generate a feature vector based on pre-processed packet samples and features from the example pre-processing circuitry 402. The example feature extraction circuitry 404 generates or builds derived values of feature vectors (e.g., representative off features in n packet samples) that are to be informative and non-redundant to facilitate the training phase of the training controller 304. As used herein, a feature vector is an n-dimensional array (e.g., a vector) of features that represent some workload category. For example, a feature could be one of the f features such as inter-packet arrival time, protocol identifier, packet direction, source and destination, packet length (e.g., bit size), QoS, etc. The example feature extraction circuitry 404 reduces processed input data (e.g., the n packet samples from the pre-processing circuitry 402) into more manageable groups (e.g., features) for processing, while describing the original network flow (e.g., data packets) with sufficient completeness and accuracy. In the illustrated example of FIG. 4, the feature extraction circuitry 404 identifies features in data packets corresponding to their intended operation (e.g., workload). The feature data provided by the pre-processing circuitry 402 facilitates the model training circuitry 406 in training a model to classify a data packet into a workload category. For example, the network packet controller 302 of FIG. 3 captures a plurality of network data packets from the wireless network device 104 corresponding to a video call. In such an example, the feature extraction circuitry 404 extracts data packet features and generates vectors for the data packets and provides the vectors to the model training circuitry 406. In some examples, the feature extraction circuitry 404 may extract a plurality of features corresponding to large sets of input data, it may extract fewer features corresponding to a smaller set of input data, etc. The number of f features corresponds to the computational capabilities of the example computing device platform 100. After the example feature extraction circuitry 404 extracts features of the packet samples, the example feature extraction circuitry 404 outputs a feature vector.

In FIG. 4, the example training controller 304 includes the example model training circuitry 406 to train a model based on the output feature vector(s) of the feature extraction circuitry 404. The example model training circuitry 406 operates in a training mode where it receives a plurality of pre-processed packet samples (e.g., feature vector(s)), generates a prediction, and outputs a model based on that prediction. For the example model training circuitry 406 to generate a model, the model training circuitry 406 receives feature vectors corresponding to pre-processed and known packet samples. For example, during a training mode, confirmations are made that the packet samples correspond to a specific workload (e.g., n packet samples are labelled with a workload type tag) so that the data packets are suitable for learning. For example, the model training circuitry 406 receives a feature vector indicative of the features of the packet samples and identifies a pattern in the features of the packet samples that maps the features of the packet samples to the workload category and outputs a model that captures these patterns. The example model training circuitry 406 provides the output model to the example error loss controller 408 to evaluate the model.

In some examples, the model training circuitry 406 implements an activation function, such as a rectified linear unit (ReLU), to help the model account for interaction effects and non-linear effects. An interaction effect is when one variable A affects a prediction (e.g., a workload type prediction) differently depending on the value of B. Non-linear effects correspond to increasing the value of an input and the output not increasing at the same rate or a decreasing value of an input that does not cause the output to decrease at the same rate. The activation function may include a plurality of activation layers that output a prediction vector to a softmax activation function. Such an output may be a fully connected vector including values indicative of likelihoods that the n packet samples correspond to a video workload, an audio workload, or a streaming workload. Additionally, the values may be indicative of likelihoods that the n packet samples correspond to additional workload such as web browsing, file downloading, etc. The softmax activation function is a function that takes an input vector (e.g., the prediction vector, a fully connected vector, etc.) consisting of K real numbers and normalizes the input vector into a probability distribution consisting of K probabilities proportional to the exponentials of the K real numbers. Put more simply, the output of the softmax activation function enables the output vectors of the activation function to be interpreted as probabilities by normalizing the real numbers to values between 0 and 1. The example model training circuitry 406 may implement any other method of learning how to classify data packets into a workload category. In examples described herein, the model training circuitry 406 identifies three categories: video, audio, and streaming. However, the example model training circuitry 406 and/or more generally the example training controller 304 is not limited to the above-mentioned three categories and can identify any number of workload types.

In FIG. 4, the example training controller 304 includes the example error loss controller 408 to evaluate the performance of the classification model. In some examples, the error loss controller 408 implements cross-entropy loss. In cross-entropy loss, the example error loss controller 408 determines that the loss value increases as the predicted probability of workload category diverges from the actual label, assigned by the example pre-processing circuitry 402. In cross-entropy loss, a perfect model would have a loss of zero. However, given that there are hundreds of different types of workloads, achieving zero loss may be impractical. Therefore, if the example error loss controller 408 determines that the model includes an acceptable amount of error and/or loss, the model may be ready for publishing. In other examples, if the example error loss controller 408 determines that the model does not meet and/or output probabilities within an acceptable amount of error and/or loss, the example error loss controller 408 may determine that re-training is to be performed by the example model training circuitry 406. Such re-training may cause the model to adjust weights applied to the n data packets and f features during activation, wherein the adjusted weights may generate a more expected output vector. In some examples, the error loss controller 408 is in communication with the model training circuitry 406 and the model publication circuitry 410.

In FIG. 4, the example training controller 304 includes the example model publication circuitry 410 to publish the model generated by the example model training circuitry 406 and provide it to the example prediction controller 306 of FIG. 3. For example, the model publication circuitry 410 receives a model from the model training circuitry 406 and transforms it into a consumable format for publishing. As used herein, consumable format is defined as a model that is intended to be used and then replaced (e.g., by an updated model). The model publication circuitry 410 transforms the model into a consumable format to constantly update the prediction controller 306 during the training and detecting phase. In some examples, the model publication circuitry 410 determines if the received model is acceptable to publish. For example, the model publication circuitry 410 may receive a new model that corresponds to video, audio, and streaming workload classes, but the model publication circuitry 410 may have previously been provided with a model corresponding to video, audio, and streaming workload classes for which that previous model has not been consumed (e.g., used) by the prediction controller 306. In this example, the model publication circuitry 410 may determine that the new received model cannot be published (e.g., until the previous model is consumed). Other examples in which a model is not acceptable to publish occur when the model publication circuitry 410 is unable to transform the model into a consumable format, and therefore cannot provide the model to the prediction controller 306.

Returning to the example NIC 200 of FIG. 3, the NIC 200 enters an inference operation when the example training controller 304 outputs a published model to the example prediction controller 306. During inference, the example active status controller 308 checks the status of the NIC 200. For example, the active status controller 308 determines if the NIC 200 is in a sleep state, an idle state, or an active state. The active status controller 308 checks the status of the NIC 200 to determine whether workload classifications are to be generated. When the example active status controller 308 determines that the NIC 200 is in the active state (e.g., receiving bi-directional network data packets corresponding to current workloads), the example active status controller 308 notifies the prediction controller 306 to infer workload types.

The example prediction controller 306 may obtain network data packets from the example network packet controller 302 and/or from the example active status controller 308. In some examples, when the prediction controller 306 obtains the network data packets from the network packet controller 302, the network packet controller 302 identifies data packets corresponding to a single network flow and provides them to the prediction controller 306. The example prediction controller 306 inputs the network data packets corresponding to a single network flow to the trained and published model. In some examples, the prediction controller 306 extracts features from the network data packets. The features assist the model in determining a workload class/type of the network flow of data packets. The example prediction controller 306 generates an output probability indicative of likelihoods of the workload class/type. For example, the prediction controller 306 generates a probability value that the network flow is an audio workload, a probability value that the network flow is a video workload, a probability value that the network flow is a streaming workload, etc. In some examples, the workload category with the highest probability value is assigned to the network data packets of the network flow. For example, the prediction controller 306 generates a flag, a message, a notification, etc., that the current network data packets are "streaming" data packets if the network data packets correspond to a streaming workload.

Figure 5:
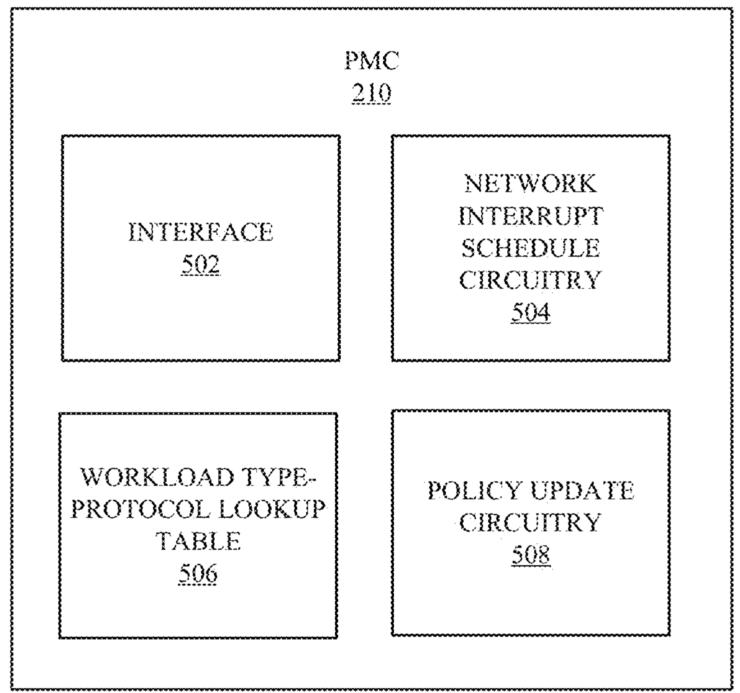
FIG. 5 is a block diagram of an example power management controller of FIG. 2.

FIG. 5 is a block diagram of an example implementation of the PMC 210 of FIG. 2. The example PMC 210 includes an example interface 502, example network interrupt schedule circuitry 504, an example workload-type/protocol lookup table 506 (e.g., a data structure), and example policy update circuitry 508. Although the components of FIG. 5 are implemented in the example PMC 210 of FIG. 2. The components of FIG. 5 may be implemented by any other component and/or circuitry within the example computing device platform 100 and/or the example wireless network device 104.

In FIG. 5, the example interface 502 obtains workload types identified by the example NIC 200. The example interface 502 may obtain the workload types from the NIC 200 via side-band messaging (e.g., via VDM messages) to allow the PMC 210 to generate a network interrupt schedule to align with hardware sleep schedules according to the workload types. Additionally, the example interface 502 may transmit instructions to one or more components of the example computing device platform 100 to enter into sleep mode and/or wake up from sleep mode based on a sleep schedule. Additionally, the interface 502 may The example network interrupt schedule circuitry 504 of FIG. 5 generates a network interrupt schedule for components of the computing device platform 100 based on the hardware sleep schedule (using the heuristics that correspond to the classified workload). For example, when the network interrupt schedule circuitry 504 obtains a workload type from the NIC 200 via the example interface 502, the network interrupt schedule circuitry 504 uses the workload type-protocol lookup table 506 to identify a workload protocol and/or heuristics (e.g., display wake, thermal info, interrupts from different sources (e.g., an OS, an application, etc.) while the workload is running) that correspond to the workload type. The workload protocol may correspond to when data packets will be sent from and/or need to be transmitted to the example wireless network device 104 based on the workload type. The example network interrupt schedule circuitry 504 may determine that particular workload types and/or corresponding protocols correspond to latency critical requirements (e.g., where there is not more than a threshold amount of time that the components can enter into sleep mode within a workload period). When the network interrupt schedule circuitry 504 determines that the workload type and/or corresponding protocol corresponds to latency critical requirements, the network interrupt schedule circuitry 504 may not generate a sleep mode because there is not sufficient time for one or more of the components to enter into the sleep mode.

If the network interrupt schedule circuitry 504 of FIG. 5 determines that the workload type and/or corresponding protocol does not correspond to latency critical requirements, the example network interrupt schedule circuitry 504 generates a network interrupt schedule that aligns with the heuristics (e.g., the hardware sleep schedule) based on the protocol corresponding to the workload type. The network interrupt schedule circuitry 504 schedules the network interrupts around hardware sleep schedule using the heuristics to ensure that the network interrupts occur when the hardware is awake. For example, if a sleep schedule corresponds to sleep mode for 15 ms followed by awake mode activity for 5 ms, the network interrupt schedule circuitry 504 will generate a network interrupt schedule that aligns the network interrupts to occur during the 5 ms of wake up. In some examples, the network interrupt schedule circuitry 504 can select whether to generate network interrupts based on the sleep state (e.g., C1, C2, or C3). After the network interrupt schedule circuitry 504 generate the network interrupt schedule to align with the hardware sleep schedule, the network interrupt schedule circuitry 504 transmits instructions to one or more components of the example computing device platform 100 to cause the one or more components to generate network interrupts based on the generated network interrupt schedule.

In FIG. 5, the example workload type/protocol lookup table 506 is a data structure that stores workloads in conjunction with corresponding protocols (e.g., when data exchange will occur during a workload) and/or heuristics. In this manner, when a workload type is obtained, the example network interrupt schedule circuitry 504 can use the corresponding protocol and/or heuristics to align network interrupts with hardware sleep and wake time. The workload type/protocol lookup table 506 may be implemented by memory, one or more registers, and/or any other device that is capable of storing data.

The example policy update circuitry 508 of FIG. 5 can translate the workload type/protocol lookup table 506 to some metric that can be used for scheduling and time-alignment. For example, the policy update circuitry 508 can update and adjust the workload type/protocol lookup table 506 in real-time for new usage scenarios and applications. In some examples, a traffic class is the can be used instead of a workload, where the data is directly sent to Wi-Fi module for power management (PM) to achieve alignment with hardware-based wake ups. In some examples, the policy update circuitry 508 obtains and/or adjusts real-time adaptation of metric used for power management policy. For example, if the power management policy considers other inputs (e.g., thermal conditions corresponding to how the compute die 206 is) to adjust sleep cycles, the policy update circuitry 508 can indicate to the workload-type identified to distinguish video playback from real-time video conference (e.g., which in another time, it may be okay to handle both as one type).

While an example manner of implementing the NIC 200 of FIG. 2 is illustrated in FIGS. 3-4 and an example manner of implementing the example PMC 210 is illustrated in FIG. 5, one or more of the elements, processes and/or devices illustrated in FIGS. 3, 4, and/or 5 may be combined, divided, re-arranged, omitted, eliminated and/or implemented in any other way. Further, the example network packet controller 302, the example training controller 304, the example prediction controller 306, the example active status controller 308, the example pre-processing circuitry 402, the example feature extraction circuitry 404, the example model training circuitry 406, the example error loss controller 408, the example model publication circuitry 410, the example interface 502, the example network interrupt schedule circuitry 504, the example workload type/protocol lookup table 506, the example policy update circuitry 508, and/or, more generally, the example NIC 200 and the example PMC 210 of FIGS. 2-5 may be implemented by hardware, software, firmware and/or any combination of hardware, software and/or firmware. Thus, for example, any of the example network packet controller 302, the example training controller 304, the example prediction controller 306, the example active status controller 308, the example pre-processing circuitry 402, the example feature extraction circuitry 404, the example model training circuitry 406, the example error loss controller 408, the example model publication circuitry 410, the example interface 502, the example network interrupt schedule circuitry 504, the example workload type/protocol lookup table 506, the example policy update circuitry 508, and/or, more generally, the example NIC 200 and the example PMC 210 of FIGS. 2-5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), NPU(s), programmable logic device(s) (PLD(s)) and/or field programmable logic device(s) (FPLD(s)). When reading any of the apparatus or system claims of this patent to cover a purely software and/or firmware implementation, at least one of the example network packet controller 302, the example training controller 304, the example prediction controller 306, the example active status controller 308, the example pre-processing circuitry 402, the example feature extraction circuitry 404, the example model training circuitry 406, the example error loss controller 408, the example model publication circuitry 410, the example interface 502, the example network interrupt schedule circuitry 504, the example workload type/protocol lookup table 506, the example policy update circuitry 508, and/or, more generally, the example NIC 200 and the example PMC 210 of FIGS. 2-5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example NIC 200 of FIG. 2 may include one or more elements, processes and/or devices in addition to, or instead of, those illustrated in FIGS. 3-4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the NIC 200 and/or PMC 210 of FIGS. 2-5 is shown in FIGS. 6-10. The machine readable instructions may be one or more executable programs or portion(s) of an executable program for execution by a computer processor and/or processor circuitry, such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 6-10, many other methods of implementing the example NIC 200 and/or the PMC 210 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 6:
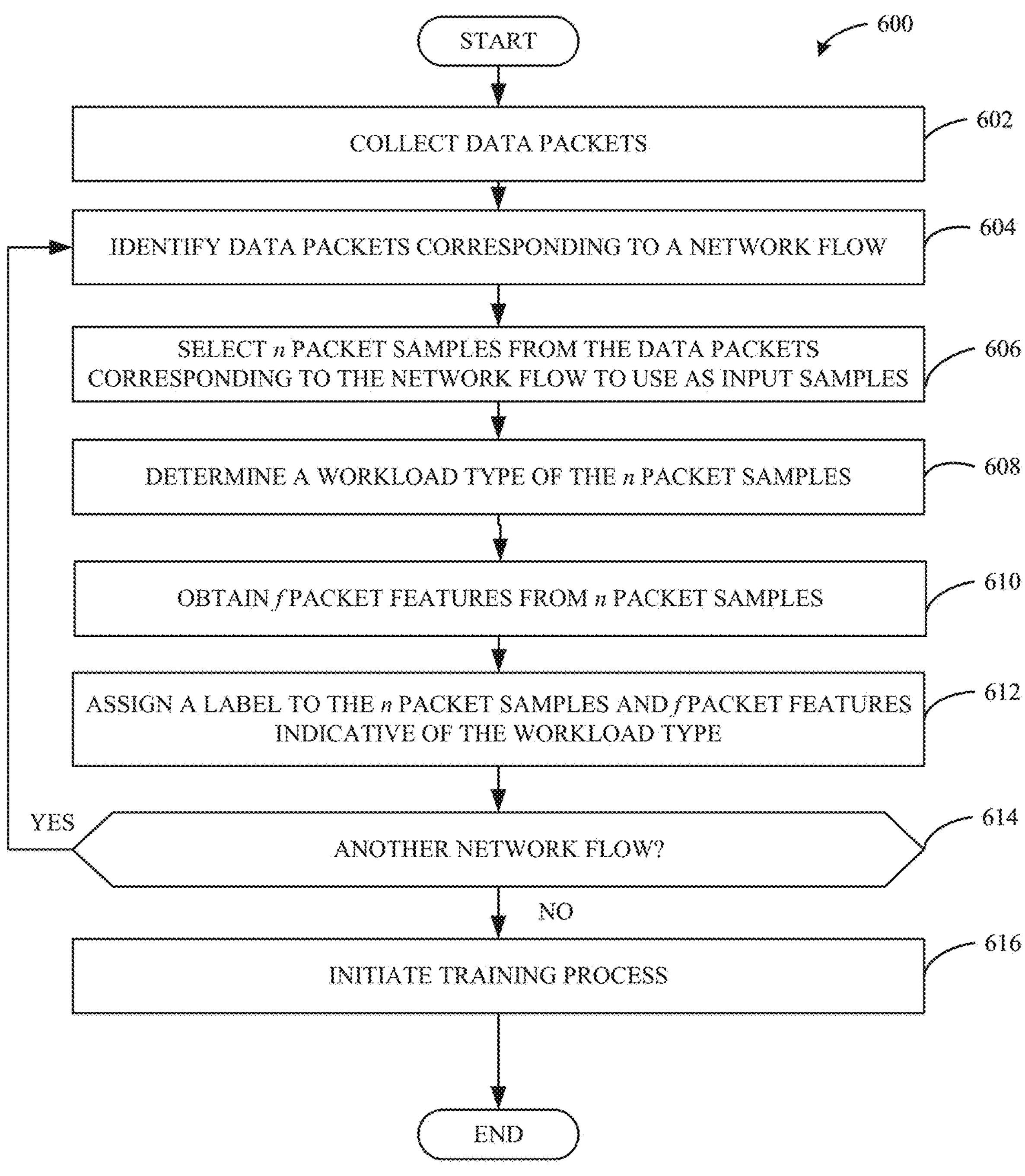
FIGS. 6 and 7 are flowcharts representative of machine readable instructions which may be executed to implement the example training controller of FIG. 4 to train a model to classify network data packets into workload categories.

FIG. 6 is a flowchart representative of example machine readable instructions and/or example operations 600 during a pre-process operation DOO that may be executed and/or instantiated by processor circuitry and/or the example NIC 200 of FIGS. 2-4 to assign workload labels to data packets of a single network flow. The machine readable instructions and/or operations 600 of FIG. 6 begin at block 602, when the example network packet controller 302 (FIG. 3) collects data packets from the example wireless network device 104 (FIG. 2). For example, the network packet controller 302 utilizes a Capture Packet Trace feature to intercept data packets between the compute die 206 (FIG. 2) and other wireless clients. In some examples, the network packet controller 302 is an interface (e.g., a NIC) that collects network traffic for the example computing device platform 100.

The example network packet controller 302 identifies data packets corresponding to a network flow (block 604). For example, the network packet controller 302 analyzes the header of the data packets to determine matching tuples between the data packets. In such an example, the data packets with matching tuples (e.g., a list of a source address number, a source port number, a destination address number, a destination port number, and a protocol number) belong to the same network flow. In some examples, the Capture Packet Trace feature stores intercepted data packets, belonging to the same network flow, in respective file locations corresponding to a workload category.

The example network packet controller 302 provides the data packets corresponding to a single network flow to the example training controller 304 and/or more specifically, the example pre-processing circuitry 402 (FIG. 4). The example pre-processing circuitry 402 selects n packet samples from the data packets corresponding to the network flow to use as input samples (block 606). For example, the pre-processing circuitry 402 determines a number of data packets that can be analyzed and used to train a model based on the computation capabilities of the NIC 200. In some examples, the pre-processing circuitry 402 is provided with a sample limit during implementation (e.g., design and manufacturing). In other examples, the pre-processing circuitry 402 queries hardware registers, modem storage, etc., for information regarding computation capabilities of the example NIC 200.

The example pre-processing circuitry 402 determines a workload type of the n packet samples (block 608). For example, the pre-processing circuitry 402 analyzes the file naming, information, and/or other characteristics of the packet traces captured by the network packet controller 302. In some examples, the pre-processing circuitry 402 determines, based on the information corresponding to the packet traces, if the packet samples correspond to real-time workloads, non-real-time workloads, etc. In other examples, the pre-processing circuitry 402 determines if the n packet samples correspond to a more specific workload type, such as video call, file download, gaming, etc.

The example pre-processing circuitry 402 obtains f packet features from the n packet samples (block 610). For example, the pre-processing circuitry 402 analyzes the headers and the frame bodies of the n samples of packets for statistical information, such as inter-packet arrival time, packet direction, protocol identifier, packet length, QoS class, etc. In some examples, the number of features f is selected based on the computational capabilities of the NIC 200.

The example pre-processing circuitry 402 assigns a label to the n packet samples and f packet features (block 612). For example, the pre-processing circuitry 402 appends an identifier (e.g., a workload type identifier), such as a character string of meta data, to the n packet samples belonging to the same network flow. In some examples, the label is identifiable by the example feature extraction circuitry 404 (FIG. 4) and model training circuitry 406 (FIG. 4) for training a model to learn the label based on features of the packets.

The example pre-processing circuitry 402 determines if there is another workflow (block 614). For example, the pre-processing circuitry 402 may have received data packets belonging to more than one network flow, separated, and/or grouped together by the network packet controller 302. If the example pre-processing circuitry 402 determines there is another network flow to label (e.g., block 614 returns a value YES), control returns to block 604. For example, the pre-processing circuitry 402 identifies the next set of data packets belonging to a single network flow. If the example pre-processing circuitry 402 determines there is not another network flow to label (e.g., block 614 returns a value NO), the example pre-processing circuitry 402 initiates the training process (block 616). For example, the pre-processing circuitry 402 triggers the feature extraction circuitry 404 by sending labelled samples of data packets.

The example pre-process operation 600 ends when the example pre-processing circuitry 402 triggers training of a model. However, the example pre-process operation 600 is repeated when the example network packet controller 302 obtains data packets corresponding to an unidentified network flow.

Figure 7:
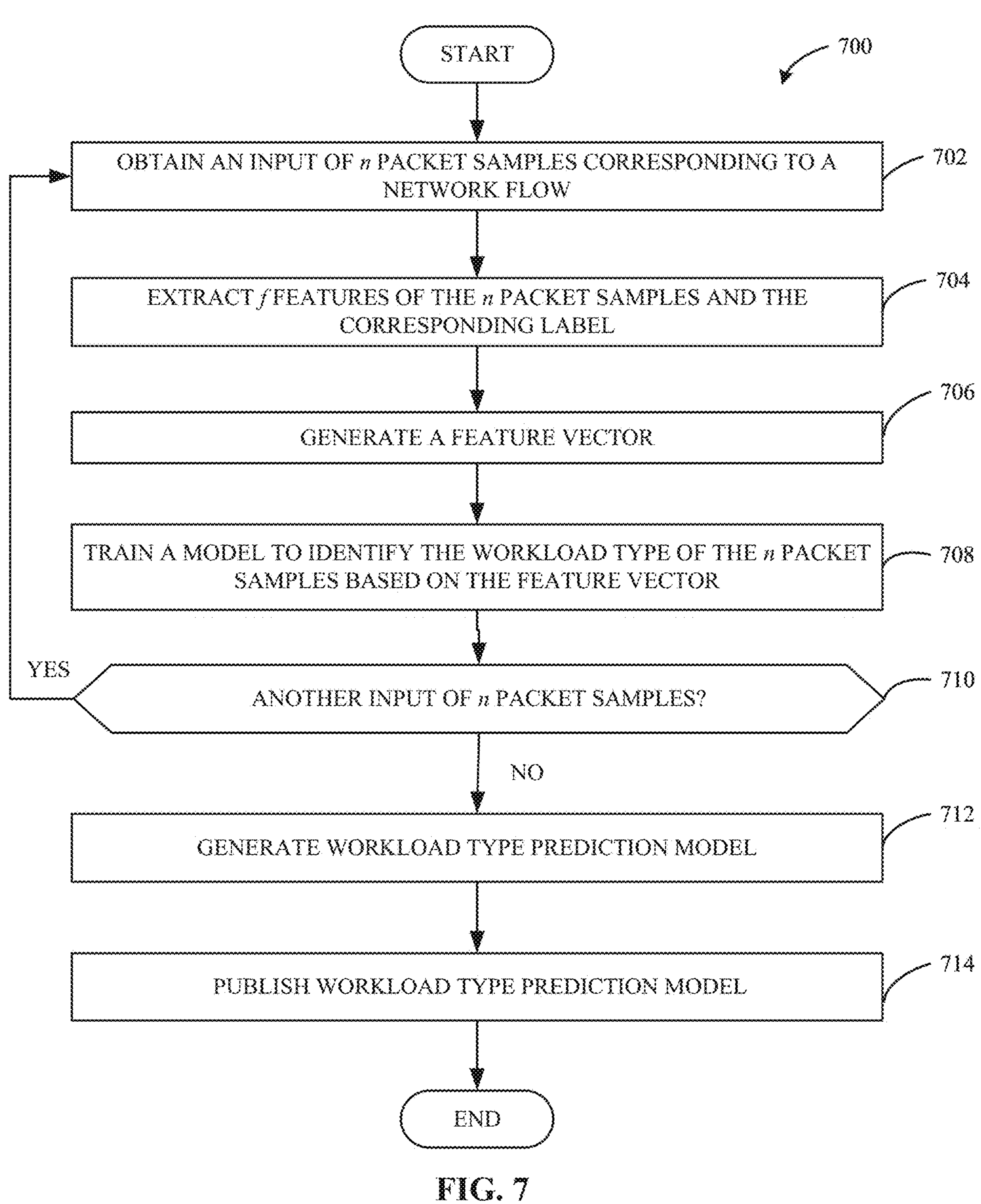

FIG. 7 is a flowchart representative of example machine readable instructions and/or example operations 700 during training that may be executed and/or instantiated by processor circuitry and/or the example NIC 200 of FIGS. 2-4 to train one or more model(s) to classify data packets into their respective workload categories (e.g., based on pre-processed labels and features). The machine readable instructions and/or operations 700 of FIG. 7 begin at block 702, when the example feature extraction circuitry 404 (FIG. 4) obtains an input of n packet samples corresponding to a network flow. For example, the feature extraction circuitry 404 obtains n packet samples from the pre-processing circuitry 402 (FIG. 4) that have been labelled with a workload type.

The example feature extraction circuitry 404 extracts f features of the n packet samples and the corresponding label (block 704). For example, the feature extraction circuitry 404 extracts the f features obtained by the pre-processing circuitry 402, where f is a number of descriptive features describing the statistical characteristics of the n packet samples. Such descriptive features characterize the intended workload of the packet samples. The example feature extraction circuitry 404 generates a feature vector (block 706). For example, the feature extraction circuitry 404 generates or builds derived values of feature vectors (e.g., representative of f features in n packet samples) that are to be informative and non-redundant to facilitate the training phase of the training controller 304.

The example model training circuitry 406 (FIG. 4) trains a model to identify the workload type of the n packet samples based on the feature vector (block 708). For example, the model training circuitry 406 receives feature vectors corresponding to pre-processed and known packet samples and identifies a pattern in the features of the packet samples that maps the features of the packet samples to the workload category and outputs a model that captures these patterns. In some examples, the output model is re-trained with different input samples until an acceptable amount of error is achieved.

The example model training circuitry 406 determines if another input of n packet samples is available (block 710). For example, the model training circuitry 406 determines whether data packets corresponding to different workloads are available. If the example model training circuitry 406 determines that another input of n packet samples is available (e.g., block 710 returns a value YES), control returns to block 702. If the example model training circuitry 406 determines that another input of n packet samples is not available (e.g., block 710 returns a value NO), then the example model training circuitry 406 generates a workload type prediction model (block 712). For example, the model training circuitry 406 outputs the trained model to the model publication circuitry 410 (FIG. 4).

The example model publication circuitry 410 publishes the workload type prediction model (block 714). For example, the model publication circuitry 410 receives a model from the model training circuitry 406 and transforms it into a consumable format for publishing. The example model publication circuitry 410 provides the published model to the example prediction controller 306 (FIG. 3) and the instructions and/or training operation 700 ends. In some examples, the instructions and/or training operation 700 is repeated when the feature extraction circuitry 404 obtains new packet samples from the pre-processing circuitry 402.

Figure 8:
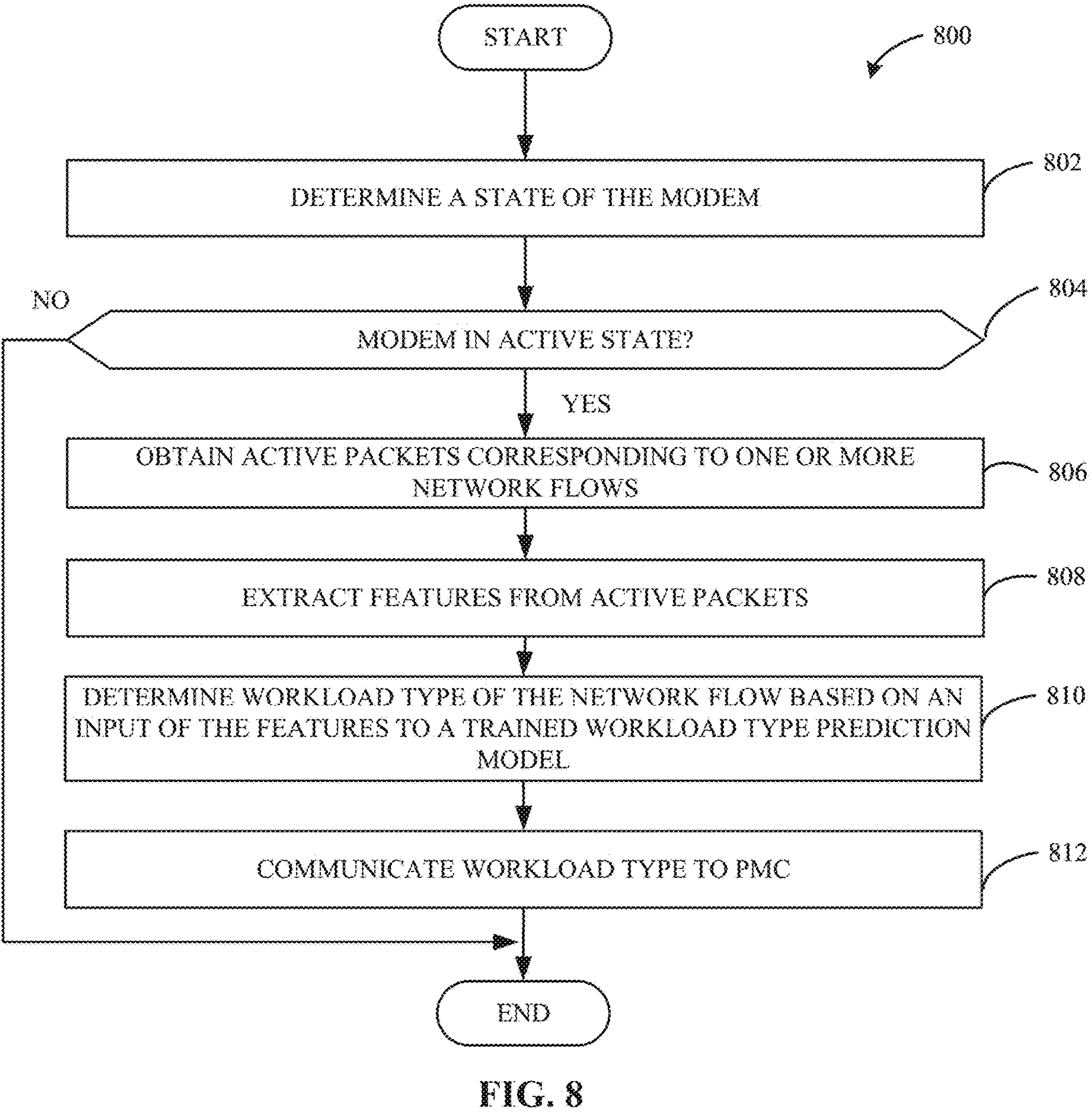
FIG. 8 is a flowchart representative of machine readable instructions which may be executed to implement the example modem of FIGS. 2-3 to classify workload types in real time.

FIG. 8 is a flowchart representative of example machine readable instructions and/or example operations 800 that may be executed and/or instantiated by processor circuitry and/or the example NIC 200 of FIGS. 2-4 to classify data packets into a workload category. The machine readable instructions and/or operations 800 of FIG. 8 begin at block 802, when the example active status controller 308 (FIG. 3)

determines a state of the example NIC 200 (FIG. 2). For example, the active status controller 308 determines whether the NIC 200 is in a sleep state, an idle state, or an active state by querying the base die 202 (FIG. 2) for information regarding the state of the compute die 206 (FIG. 2) (e.g., on or off), which corresponds to and/or is associated with the state of the NIC 200. The example active status controller 308 determines whether the NIC 200 is in an active state (block 804). For example, the active status controller 308 determines if the NIC 200 is executing, processing, receiving, and/or sending data. If the example active status controller 308 determines the NIC 200 is not in an active state (e.g., block 804 returns a value NO), the example inference operation 800 ends. For example, if the NIC 200 is in a sleep state or an idle state, the compute die 206 can go into a deep power saving state.

If the example active status controller 308 determines the NIC 200 is in an active state (block 804: YES), the example prediction controller 306 obtains active packets corresponding to one or more network flows (block 806). For example, the network packet controller 302 provides network data packets, captured, to the prediction controller 306 for analysis and classification. In some examples, the active status controller 308 triggers the network packet controller 302 to send the active data packets to the prediction controller 306. In other examples, the active status controller 308 initiates the prediction controller 306 to query the network packet controller 302 for the active data packets.

The example prediction controller 306 extracts features from the active packets (block 808). For example, the prediction controller 306 identifies statistical information in the header(s) of the data packet(s) and extracts them out into a feature vector. The example prediction controller 306 determines a workload type of the network flow based on an input of the features to a trained workload type prediction model (block 810). For example, the prediction controller 306 implements the model, published by the training controller 304 (FIG. 3), to output a prediction about the classification of the active data packets. In some examples, the prediction indicates whether the active data packets are most likely to belong to a real-time workload, a non-real-time workload, a video call workload, a gaming workload, a file download workload, etc.

The example prediction controller 306 communicates workload type to the compute die 206 (block 812). For example, the prediction controller 306 generates VDM messages, informing the compute die 206 of the workload type so that the PMC 210 can develop a network interrupt schedule to align with the sleep schedule based on the workload type to reduce power consumption.

Figure 9:
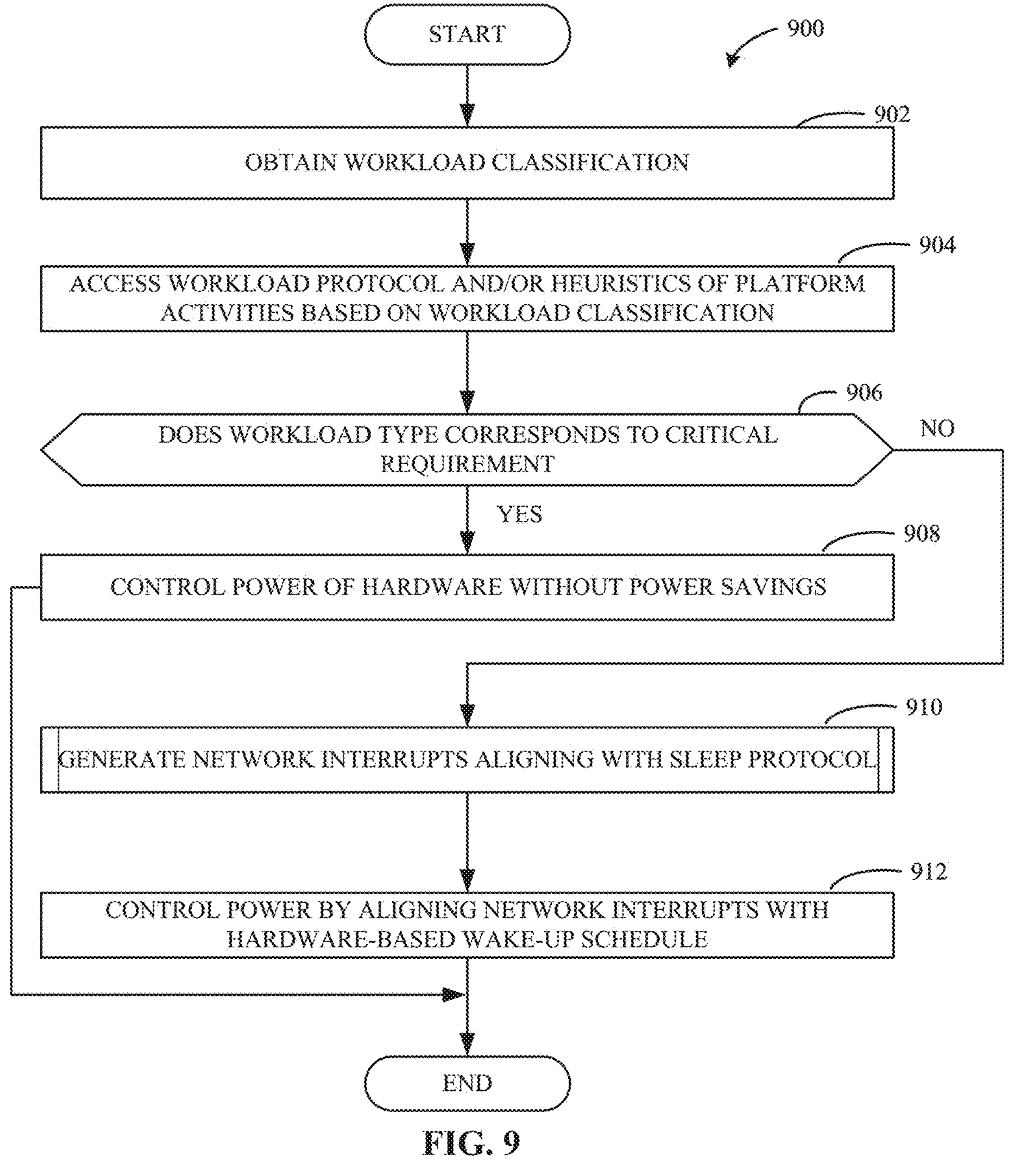
FIGS. 9 and 10 are flowcharts representative of machine readable instructions which may be executed to implement the example power management controller of FIG. 5 to align network interrupts with hardware sleep schedules.

FIG. 9 is a flowchart representative of example machine readable instructions and/or example operations 900 that may be executed and/or instantiated by processor circuitry and/or the example PMC 210 of FIG. 5 to align with network interrupts with a hardware sleep schedule. The machine readable instructions and/or operations 900 of FIG. 9 begin at block 902, when the example interface 502 obtains a classified workload from the NIC 200 (e.g., based on side-band messages via the base die 202). The classified workload corresponds to the type of workload that the NIC 200 is currently operating in conjunction with. For example, the classified workload may be one or more types of a streaming video, streaming audio, video teleconference, audio teleconference, etc.

At block 904, the example network interrupt schedule circuitry 504 accesses the workload protocol and/or heuristics of platform activities from the workload type/protocol lookup table 506 based on the classified workload. For example, the network interrupt schedule circuitry 504 uses the workload to find information corresponding to the workload (e.g., latency requirements, transmission protocol, interrupt protocol, display wake, thermal info, interrupts from different sources (e.g., an OS, an application, etc.) while the workload is running), etc.) in the workload type/protocol lookup table 506. At block 906, the example network interrupt schedule circuitry 504 determines if the workload types corresponds to a critical requirement(s). As described above, some workloads may correspond to one or more critical requirements where more than a threshold duration of a time period is used to obtain and/or processes incoming and/or outgoing network traffic. Such workloads do allow sufficient time for hardware components to enter into a sleep mode. An indication of critical requirement(s) may be part of the information stored in the workload type/protocol lookup table 506 in conjunction with the workload type. Accordingly, the network interrupt schedule circuitry 504 can determine whether the workload type corresponds to a critical requirement(s) based on the corresponding information from the workload type/protocol lookup table 506.

If the example network interrupt schedule circuitry 504 determines that the workload type corresponds to a critical requirement(s) (block 906: YES), the PMC 210 controls the power of the hardware without using power savings (e.g., without operating with a sleep mode to comply with the critical requirement(s)) (block 908). If the example network interrupt schedule circuitry 504 determines that the workload type does not correspond to critical requirement(s) (block 906: NO), the example network interrupt schedule circuitry 504 generates a network interrupt schedule aligning to align with the hardware sleep schedule (block 910), as further described below in conjunction with FIG. 10. At block 912, the example PMC 210 controls power of by aligning network interrupts with the hardware-based wake-up schedule. For example, the PMC 210 may instruct one or more parts of the compute die 206, the memory 214, the base die 202, and/or the NIC 200 to enter into align network interrupts based on the hardware sleep schedule to ensure that network interrupts occur while the hardware is awake. Because the network interrupts are aligned with sleep schedule, the hardware components can spend more time operating in sleep mode than traditional techniques, thereby resulting in power savings. During the wake time, the compute die 206 can complete the network work items (e.g., functions, operation, instructions, etc.) while handing other compute device platform activities.

Figure 10:
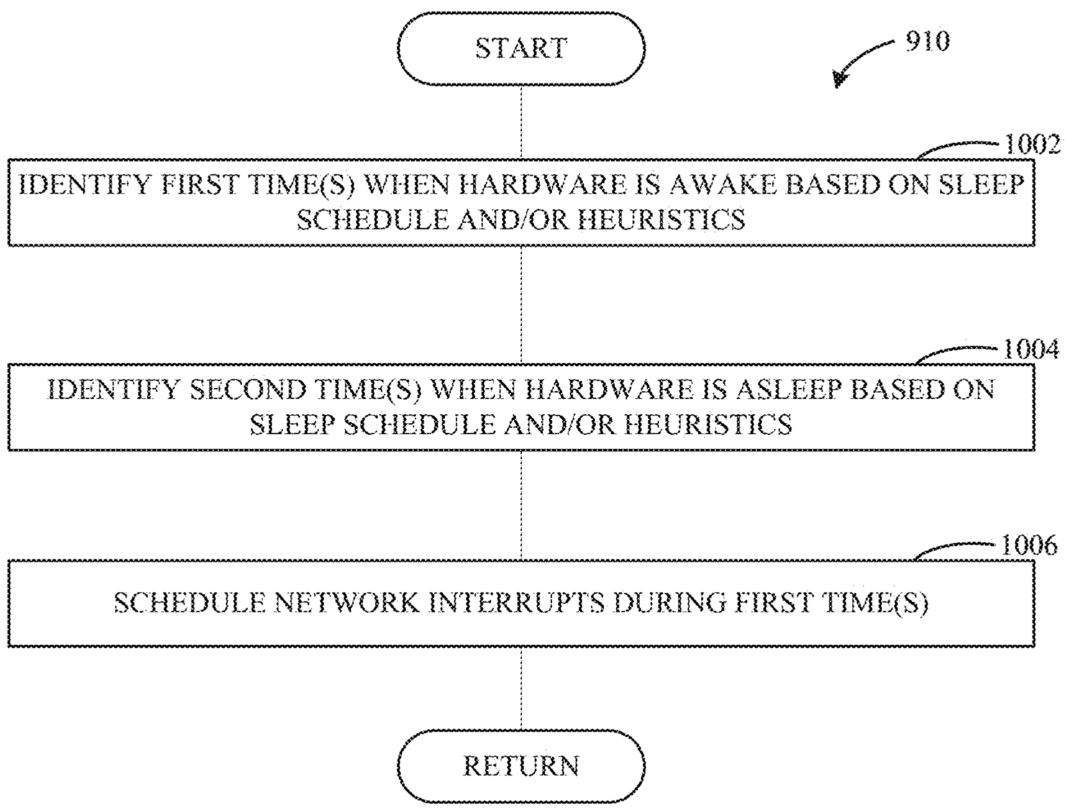

FIG. 10 is a flowchart representative of example machine readable instructions and/or example operations that may be executed and/or instantiated by processor circuitry and/or the example PMC 210 of FIG. 5 to generate a network interrupt schedule corresponding to NIC activity based on the hardware sleep schedule using workload protocol, as described above in conjunction with block 910 of FIG. 9. The machine readable instructions and/or operations of FIG. 10 begin at block 1002, when the example network interrupt schedule circuitry 504 identifies first time(s) when hardware is awake based on the heuristics and/or sleep schedule generated by the PMC 210

At block 1004, the example network interrupt schedule circuitry 504 identifies second time(s) when the hardware is asleep based on the sleep schedule and/or the heuristics. At block 1006, the example network interrupt schedule circuitry 504 schedules the network interrupts with the first time(s), thereby aligning the network interrupts with the hardware sleep schedule. After block 1006, control returns to block 912 of FIG. 9.

Figure 11:
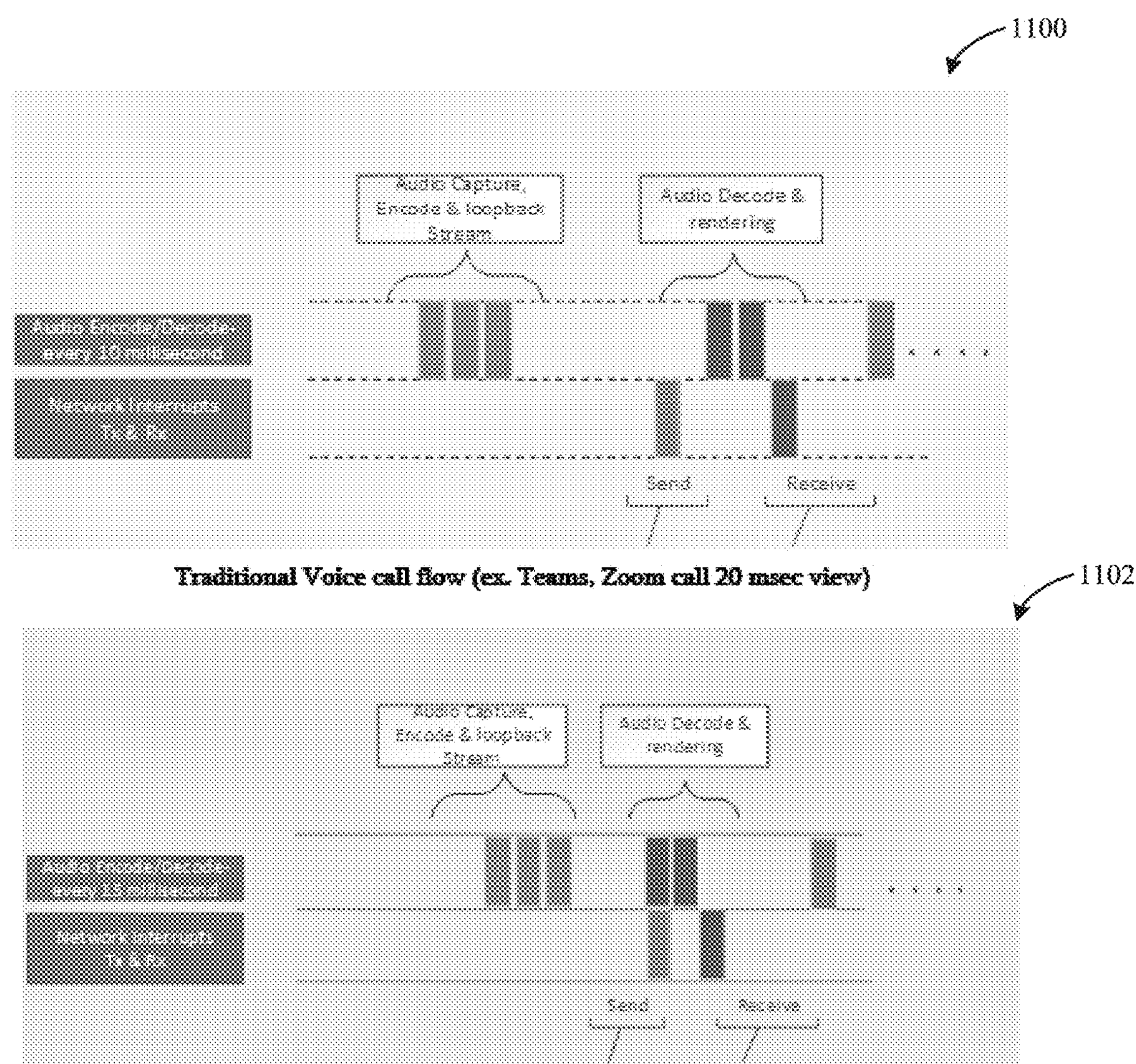
FIG. 11 illustrates example timing diagrams that illustrate the power savings using examples disclosed herein.

FIG. 11 illustrates an example of the power savings corresponding to examples disclosed herein. FIG. 11 includes a first example timing diagram 1100 corresponding to traditional network interrupt scheduling for a video conferencing workload and a second example timing diagram 1102 corresponding to network interrupt scheduling for a video conference workload using examples disclosed herein.

In the first example timing diagram 1100 of FIG. 11, interrupts to the compute die 206 are random in nature and are not coordinated with any other CPU wake events. If all the tasks specific to an audio call (e.g., audio encode, audio decode, network operations, etc.) are spread out across a period of time, there will be an increased number of CPU wakes based on the different time. The second example timing diagram 1102, illustrates better coordination between all IPs with P-UNIT heuristics like time to next timer events (TNTE) and Network alignment with Audio wakes and vice versa. Thus, the complete CPU operation can be performed within short interval (e.g., 5 ms in a 20 ms Traffic pattern), thereby resulting in 15 ms of CPU idleness (e.g., sleep mode). Accordingly, P-unit/PMC-based time sync on the network wake information on the NIC 200 will better time align using buffering capabilities to help coalesce within the NIC 200 or the wireless network device 104 via the targeted wake time mechanism, thereby providing power saving gains.

Figure 12:
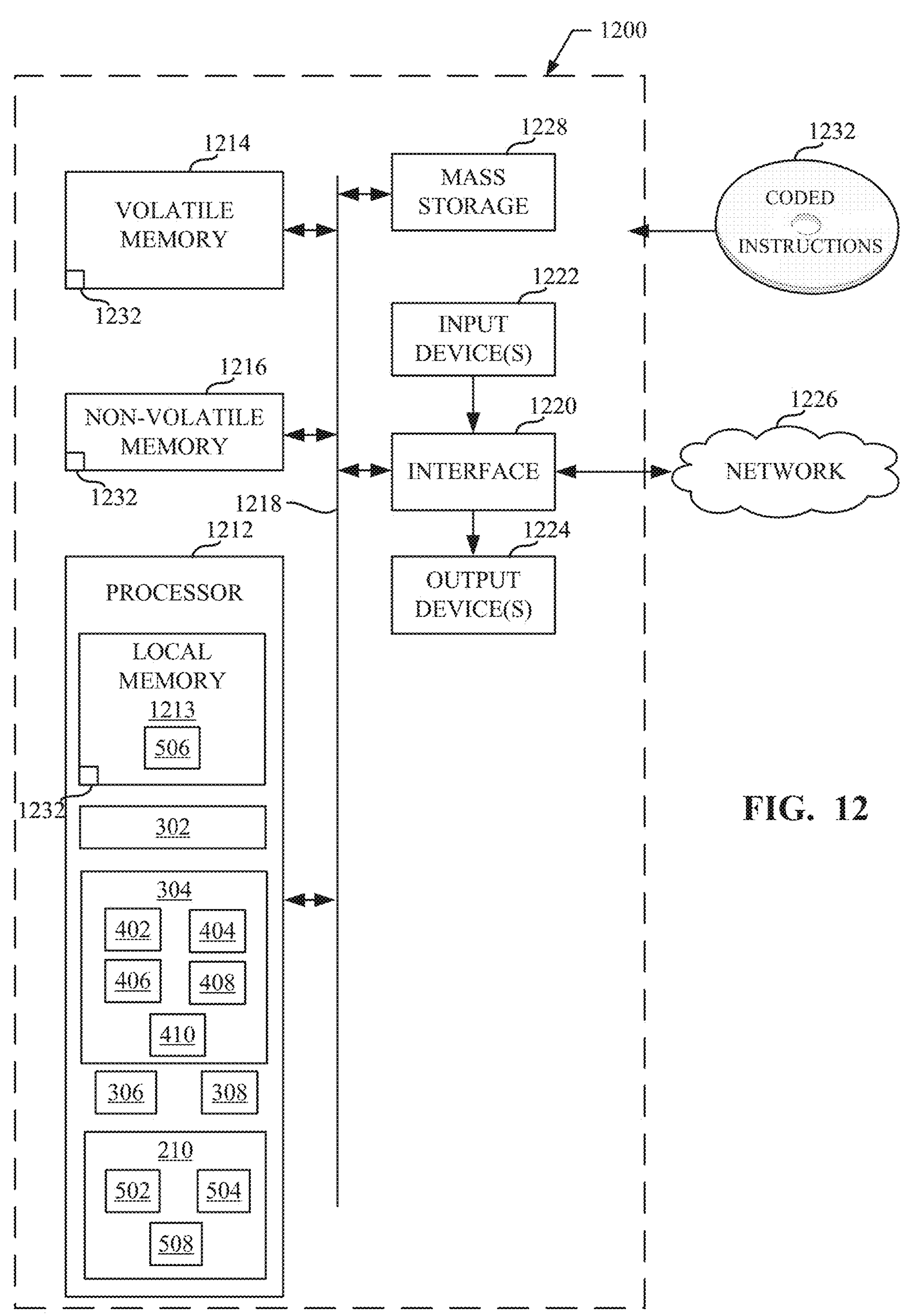
FIG. 12 is a block diagram of an example processing platform structured to execute the instructions of FIGS. 6-10 to implement the example computing device platform of FIG. 1.

FIG. 12 is a block diagram of an example processor platform 1200 structured to execute the instructions of FIGS. 6-10 to implement the NIC 200 and/or the PMC 210 of FIGS. 2, 3, 4, and/or 5. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, NPUs, GPUs, DSPs, or controllers from any desired family or manufacturer. The hardware processor may be a semiconductor based (e.g., silicon based) device. In this example, the processor implements the example NIC 200, the PMC 210, the example network packet controller 302, the example training controller 304, the example prediction controller 306, the example active status controller 308, the example preprocessing circuitry 402, the example feature extraction circuitry 404, the example model training circuitry 406, the example error loss controller 408, the example model publication circuitry 410, the example interface 502, the example network interrupt schedule circuitry 504, and the example policy update circuitry 508, of FIGS. 2-5.

The processor 1212 of the illustrated example includes a local memory 1213 (e.g., a cache). In some examples, the local memory 1213 implements the example workload type/protocol lookup table 506 of FIG. 5. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip, and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 6-10 may be stored in the mass storage device 1228, in the volatile memory 1214, in the non-volatile memory 1216, and/or on a removable non-transitory computer readable storage medium such as a CD or DVD.

Figure 13:
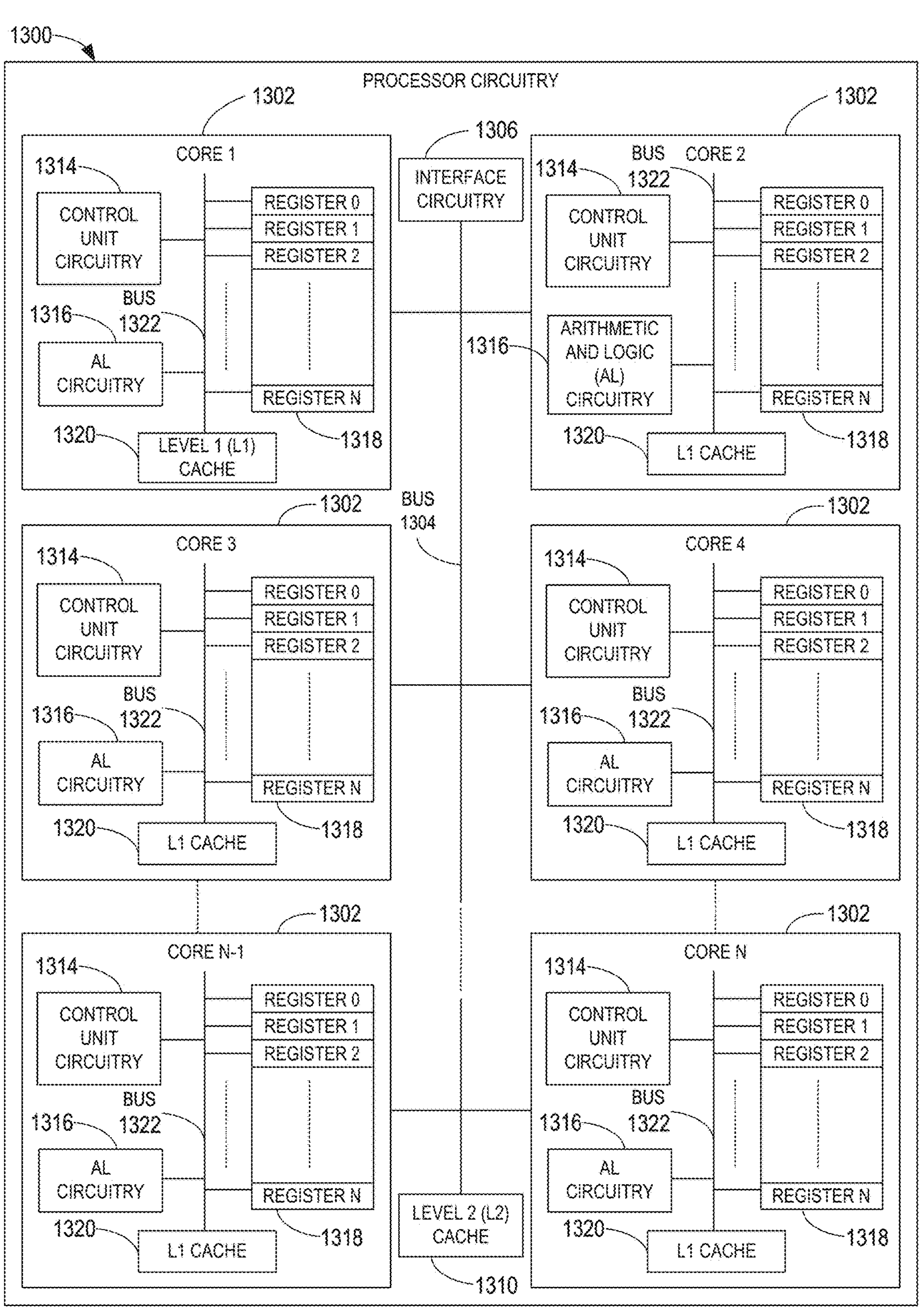
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a microprocessor 1300. For example, the microprocessor _ 00 may implement multi-core hardware circuitry such as a CPU, a DSP, a GPU, an NPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 6-10.

The cores 1302 may communicate by an example bus 1304. In some examples, the bus 1304 may implement a communication bus to effectuate communication associated with one(s) of the cores 1302. For example, the bus 1304 may implement at least one of an Inter-Integrated Circuit (I2C) bus, a Serial Peripheral Interface (SPI) bus, a PCI bus, or a PCIe bus. Additionally or alternatively, the bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_ cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, NPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and an example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register (s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The bus 1304 may implement at least one of an I2C bus, a SPI bus, a PCI bus, or a PCIe bus Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
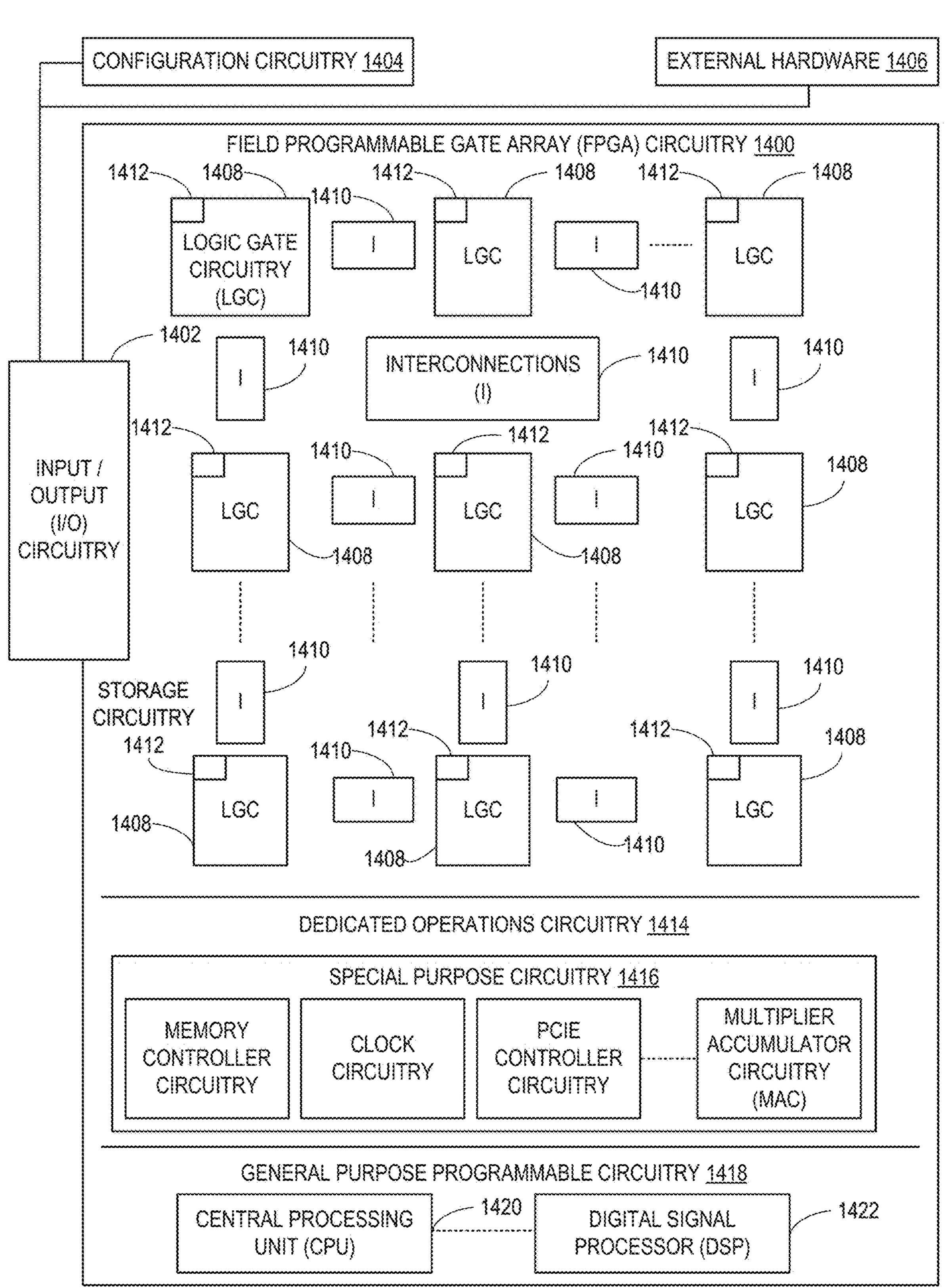
FIG. 14 is a block diagram of another example implementation of the processor circuitry of FIG. 12.
Figure 15:
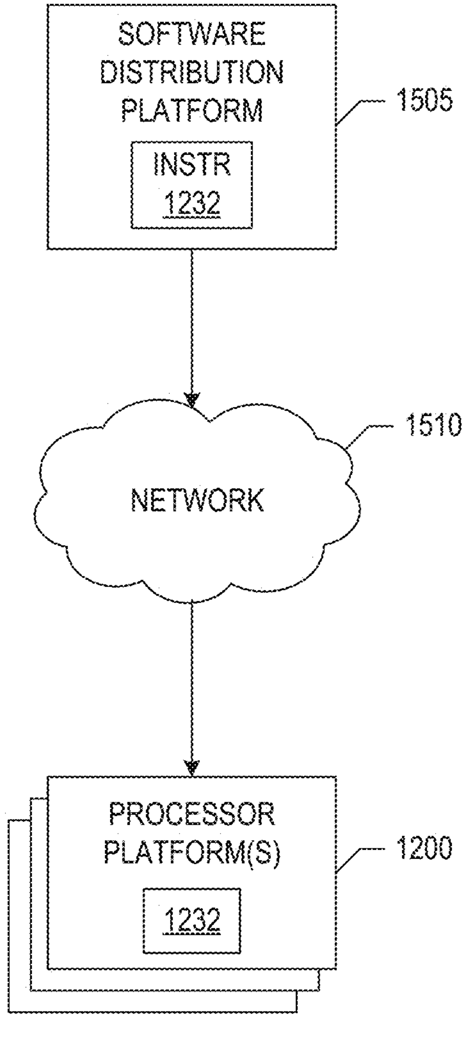
FIG. 15 is a block diagram of an example software distribution platform (e.g., one or more servers) to distribute software (e.g., software corresponding to the example machine readable instructions of FIGS. 6-10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

FIG. 14 is a block diagram of another example implementation of the processor circuitry 1212 of FIG. 12. In this example, the processor circuitry 1212 is implemented by FPGA circuitry 1400. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 6-10 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIGS. 6-10. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 6-10. As such, the FPGA circuitry 1400 may be structured to effectively instantiate some or all of the machine readable instructions of the flowcharts of FIGS. 6-10 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIG. 14 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIGS. 6-10 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an NPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modem FPGA circuitry may include an on-board CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowcharts of FIGS. 6-10 may be executed by one or more of the cores 1302 of FIG. 13 and a second portion of the machine readable instructions represented by the flowcharts of FIGS. 6-10 may be executed by the FPGA circuitry 1400 of FIG. 14.

In some examples, the processor circuitry 1212 of FIG. 12 may be in one or more packages. For example, the processor circuitry 1212 of FIG. 12 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

A block diagram illustrating an example software distribution platform 1505 to distribute software such as the example machine readable instructions 1332 of FIG. 13 to hardware devices owned and/or operated by third parties is illustrated in FIG. 13. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1232, which may correspond to the example machine readable instructions 600, 700, 800, 900, 910 of FIGS. 6-10, as described above. The one or more servers of the example software distribution platform 1505 are in communication with a network 1510, which may correspond to any one or more of the Internet and/or any of the example network 102 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232 from the software distribution platform 1505. For example, the software, which may correspond to the example machine readable instructions 1232 of FIG. 12, may be downloaded to the example processor platform 400, which is to execute the machine readable instructions 1232 to implement the computing device platform 100. In some example, one or more servers of the software distribution platform 1505 periodically offer, transmit, and/or force updates to the software (e.g., the example machine readable instructions 1232 of FIG. 12 to ensure improvements, patches, updates, etc., are distributed and applied to the software at the end user devices.

From the foregoing, it will be appreciated that example methods, apparatus and articles of manufacture have been disclosed to align network traffic to improve power consumption. The examples disclosed herein use an AI-based model to identify workload types and align the network interrupts with hardware sleep schedule developed by a power management controller based on the identified workloads. The disclosed methods, apparatus and articles of manufacture improve the efficiency of using a computing device by facilitating power saving and/or increasing battery life. The disclosed methods, apparatus and articles of manufacture are accordingly directed to one or more improvement(s) in the functioning of a computer.

Example methods, apparatus, systems, and articles of manufacture to align network traffic to improve power consumption are disclosed herein. Further examples and combinations thereof include the following:

Example 1 includes an apparatus to schedule an interrupt, the apparatus comprising a machine learning model to classify a workload based on network packets obtained via a wireless communication, a power management controller to determine heuristics of platform activities corresponding to the workload, and schedule network interrupts based on hardware-based wake interrupts from a sleep mode using the heuristics.

Example 2 includes the apparatus of example 1, wherein the machine learning model to classify the workload by determining a likelihood that a number of packets correspond to the workload based on a trained model.

Example 3 includes the apparatus of example 2, wherein the machine learning model is to extract a number of features from the number of packets corresponding to statistical characteristics of packets to generate a feature vector, wherein the prediction is based on the feature vector.

Example 4 includes the apparatus of example 1, wherein the power management controller is to determine the heuristics using a data structure corresponding to workloads linked to corresponding heuristics.

Example 5 includes the apparatus of example 4, wherein the instruction cause the one or more processors to adapt entries in the data structure corresponding to a policy.

Example 6 includes the apparatus of example 1, wherein the power management controller is to schedule the network interrupts to align with the hardware based-wake interrupts.

Example 7 includes the apparatus of example 1, wherein the power management controller is to identify occurrences of the hardware-based wake interrupts based on the heuristics.

Example 8 includes the apparatus of example 1, wherein the power management controller is to in response to determining that the workload corresponds to more than a threshold duration of a time period is used to process network traffic, refrain from operating in the sleep mode.

Example 9 includes a non-transitory computer readable storage medium comprising instructions which, when executed cause one or more processors to classify a workload based on network packets obtained via a wireless communication, determine heuristics of platform activities corresponding to the workload, and schedule network interrupts based on hardware-based wake interrupts from a sleep mode using the heuristics.

Example 10 includes the computer readable storage medium of example 9, wherein the instructions cause the one or more processors to classify the workload by determining a likelihood that a number of packets correspond to the workload based on a trained model.

Example 11 includes the computer readable storage medium of example 10, wherein the instructions cause the one or more processors to extract a number of features from the number of packets corresponding to statistical characteristics of packets to generate a feature vector, wherein the prediction is based on the feature vector.

Example 12 includes the computer readable storage medium of example 9, wherein the instructions cause the one or more processors to identify the heuristics using a data structure corresponding to workloads linked to corresponding heuristics.

Example 13 includes the computer readable storage medium of example 12, wherein the instruction cause the one or more processors to adapt entries in the data structure corresponding to a policy.

Example 14 includes the computer readable storage medium of example 9, wherein the instructions cause the one or more processors to schedule the network interrupts to align with the hardware-based wake interrupts.

Example 15 includes the computer readable storage medium of example 9, wherein the instructions cause the one or more processors to determine occurrences of the hardware-based wake interrupts based on the heuristics.

Example 16 includes the computer readable storage medium of example 9, wherein the instructions cause the one or more processors to in response to determining that the workload corresponds to more than a threshold duration of a time period is used to process network traffic, refrain from operating in the sleep mode.

Example 17 includes a method to schedule interrupts, the method comprising classifying, by executing an instruction with a machine learning model, a workload based on network packets obtained via a wireless communication, determining, by executing an instruction with a processor, heuristics of platform activities corresponding to the workload, and scheduling, by executing an instruction with the processor, network interrupts based on hardware-based wake interrupts from a sleep mode using the heuristics.

Example 18 includes the method of example 17, wherein the classifying of the workload includes determining a likelihood that a number of packets correspond to the workload based on a trained model.

Example 19 includes the method of example 18, further including extracting a number of features from the number of packets corresponding to statistical characteristics of packets to generate a feature vector, wherein the prediction is based on the feature vector.

Example 20 includes the method of example 17, further including determining the heuristics using a data structure corresponding to workloads linked to corresponding heuristics.

Example 21 includes the method of example 20, wherein the instruction cause the one or more processors to adapt entries in the data structure corresponding to a policy.

Example 22 includes the method of example 17, wherein the scheduling includes scheduling the network interrupts to align with the hardware based-wake interrupts.

Example 23 includes the method of example 17, further including identifying occurrences of the hardware-based wake interrupts based on the heuristics.

Example 24 includes the method of example 17, further including in response to determining that the workload corresponds to more than a threshold duration of a time period is used to process network traffic, refraining from operating in the sleep mode.

Example 25 includes an apparatus to schedule an interrupt, the apparatus comprising means for classifying a workload based on network packets obtained via a wireless communication, means for scheduling, the means for scheduling to determine heuristics of platform activities corresponding to the workload, and schedule network interrupts based on hardware-based wake interrupts from a sleep mode using the heuristics.

Example 26 includes the apparatus of example 25, wherein the means for classifying is to classify the workload by determining a likelihood that a number of packets correspond to the workload based on a trained model.

Example 27 includes the apparatus of example 26, wherein the means for classifying is to extract a number of features from the number of packets corresponding to statistical characteristics of packets to generate a feature vector, wherein the prediction is based on the feature vector.

Example 28 includes the apparatus of example 25, wherein the means for scheduling is to identify the heuristics using a data structure corresponding to workloads linked to corresponding heuristics.

Example 29 includes the apparatus of example 28, wherein the instruction cause the one or more processors to adapt entries in the data structure corresponding to a policy.

Example 30 includes the apparatus of example 25, wherein the means for scheduling is to schedule the network interrupts to align with the hardware based-wake interrupts.

Example 31 includes the apparatus of example 25, wherein the means for scheduling is to determine occurrences of the hardware-based wake interrupts based on the heuristics.

Example 32 includes the apparatus of example 25, wherein the means for scheduling is to in response to determining that the workload corresponds to more than a threshold duration of a time period is used to process network traffic, refrain from operating in the sleep mode.

Example 33 includes an apparatus to schedule an interrupt, the apparatus comprising at least one memory, and processor circuitry including one or more of at least one of a central processing unit, a graphic processing unit, a neural processing unit, or a digital signal processor, the at least one of the central processing unit, the graphic processing unit, the neural processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry including logic gate circuitry to perform one or more third operations, the processor circuitry to at least one of perform at least one of the first operations, the second operations or the third operations to classify a workload based on network packets obtained via a wireless communication, determine heuristics of platform activities corresponding to the workload, and schedule network interrupts based on hardware-based wake interrupts from a sleep mode using the heuristics.

Example 34 includes the apparatus of example 33, wherein the processor circuitry is to classify the workload by determining a likelihood that a number of packets correspond to the workload based on a trained model.

Example 35 includes the apparatus of example 34, wherein the processor circuitry is to extract a number of features from the number of packets corresponding to statistical characteristics of packets to generate a feature vector, wherein the prediction is based on the feature vector.

Example 36 includes the apparatus of example 33, wherein the processor circuitry is to determine the heuristics using a data structure corresponding to workloads linked to corresponding heuristics.

Example 37 includes the apparatus of example 36, wherein the instruction cause the one or more processors to adapt entries in the data structure corresponding to a policy.

Example 38 includes the apparatus of example 33, wherein the processor circuitry is to schedule the network interrupts to align with the hardware based-wake interrupts.

Example 39 includes the apparatus of example 33, wherein the processor circuitry is to identify occurrences of the hardware-based wake interrupts based on the heuristics.

Example 40 includes the apparatus of example 33, wherein the processor circuitry is to in response to determining that the workload corresponds to more than a threshold duration of a time period is used to process network traffic, refrain from operating in the sleep mode.

Example 41 includes the apparatus of example 33, wherein scheduling the hardware-based wake interrupts based on the network interrupts increases power savings.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to schedule an interrupt, the apparatus comprising:

- a machine learning model to determine a workload classification by classifying a workload based on network packets obtained via a wireless communication;
- a power management controller to:
  - determine a workload protocol for the workload based on the workload classification;
  - determine thermal information for a platform while running the workload;
  - identify, based on the workload protocol and the thermal information, a hardware-based sleep schedule that defines one or more wake windows corresponding to predicted network activity intervals of the workload protocol, the hardware-based sleep schedule to identify a subsequent duration of time when hardware will be awake to service network interrupts associated with the workload; and
  - schedule a network interrupt based on the hardware-based sleep schedule.

2. The apparatus of claim 1, wherein the machine learning model is to classify the workload by determining a likelihood that a number of packets correspond to the workload based on a trained model.

3. The apparatus of claim 2, wherein the machine learning model is to extract a number of features from the number of packets corresponding to statistical characteristics of packets to generate a feature vector, wherein the classification of the workload is based on the feature vector.

4. The apparatus of claim 1, wherein the power management controller is to determine the hardware-based sleep schedule based on heuristics derived from the workload protocol, the power management controller to determine the heuristics using a data structure corresponding to workloads linked to corresponding heuristics.

5. The apparatus of claim 4, wherein the power management controller is to adapt entries in the data structure corresponding to a policy.

6. The apparatus of claim 1, wherein the power management controller is to schedule the network interrupt to occur within a wake window of the hardware-based sleep schedule corresponding to the predicted network activity interval of the workload protocol.

7. The apparatus of claim 4, wherein the power management controller is to identify occurrences of hardware-based wake interrupts of the hardware-based sleep schedule based on the heuristics.

8. The apparatus of claim 1, wherein the power management controller is to in response to determining that the workload corresponds to more than a threshold duration of a time period is used to process network traffic, refrain from operating in sleep mode.

9. A non-transitory computer readable storage medium comprising instructions which cause one or more processors to:

determine a workload classification by classifying a workload based on network packets obtained via a wireless communication;

determine a workload protocol for the workload based on the workload classification, the workload protocol identifying when interrupts occur while the workload is running;

determine an operating system-based interrupt schedule or an application-based interrupt schedule for a platform while running the workload;

identify, based on the workload protocol and the operating system-based interrupt schedule or the application-based interrupt schedule, a hardware-based sleep schedule that defines one or more wake windows corresponding to predicted network activity intervals of the workload protocol, the hardware-based sleep schedule to identify a subsequent duration of time when hardware will be awake to service network interrupts associated with the workload; and schedule a network interrupt based on the hardware-based sleep schedule.

10. The computer readable storage medium of claim 9, wherein the instructions cause the one or more processors to classify the workload by determining a likelihood that a number of packets correspond to the workload based on a trained model.

11. The computer readable storage medium of claim 10, wherein the instructions cause the one or more processors to extract a number of features from the number of packets corresponding to statistical characteristics of packets to generate a feature vector, wherein the classification of the workload is based on the feature vector.

12. The computer readable storage medium of claim 9, wherein the instructions cause the one or more processors to:

determine heuristics using a data structure corresponding to workloads linked to corresponding heuristics; and determine the hardware-based sleep schedule based on the heuristics.

13. The computer readable storage medium of claim 12, wherein the instruction cause the one or more processors to adapt entries in the data structure corresponding to a policy.

14. The computer readable storage medium of claim 9, wherein the instructions cause the one or more processors to schedule the network interrupt to align with a hardware-based wake interrupt of the hardware-based wake interrupt schedule.

15. The computer readable storage medium of claim 12, wherein the instructions cause the one or more processors to determine occurrences of hardware-based wake interrupts of the hardware-based sleep schedule based on the heuristics.

16. The computer readable storage medium of claim 9, wherein the instructions cause the one or more processors to in response to determining that the workload corresponds to more than a threshold duration of a time period is used to process network traffic, refrain from operating in sleep mode.

17. A method to schedule interrupts, the method comprising:

determining, by executing an instruction with a machine learning model, a workload classification by classifying a workload based on network packets obtained via a wireless communication;

determining, by executing an instruction with processor circuitry, a workload protocol for the workload based on the workload classification, the workload protocol identifying when interrupts occur while the workload is running;

determining, by executing an instruction with the processor circuitry, a display wake schedule for a platform while running the workload;

determining, by executing an instruction with the processor circuitry, a hardware-based sleep schedule based on the workload protocol and the display wake schedule, the hardware-based sleep schedule defining one or more wake windows corresponding to predicted network activity intervals of the workload protocol, the hardware-based sleep schedule identifying a subsequent duration of time when hardware will be awake to service network interrupts associated with the workload; and scheduling, by executing an instruction with the processor circuitry, a network interrupt based on the hardware-based sleep schedule.

18. The method of claim 17, wherein the classifying of the workload includes determining a likelihood that a number of packets correspond to the workload based on a trained model.

19. The method of claim 18, including extracting a number of features from the number of packets corresponding to statistical characteristics of packets to generate a feature vector, wherein the classification of the workload is based on the feature vector.

20. The method of claim 17, including:

determining heuristics using a data structure corresponding to workloads linked to corresponding heuristics; and determining the hardware-based sleep schedule based on the heuristics.

21. The method of claim 20, including adapting entries in the data structure corresponding to a policy.

22. The method of claim 17, wherein the scheduling includes scheduling the network interrupt to align with a hardware-based wake interrupt of the hardware-based sleep schedule.

23. The method of claim 20, including identifying occurrences of hardware-based wake interrupts of the hardware-based sleep schedule based on the heuristics.

24. The method of claim 17, including in response to determining that the workload corresponds to more than a threshold duration of a time period is used to process network traffic, refraining from operating in sleep mode.

* * * * *